US012676157B2

(12) United States Patent
Gao et al.

(10) Patent No.: US 12,676,157 B2
(45) **Date of Patent: *Jul. 7, 2026**

(54) THREE-DIMENSIONAL AUDIO SIGNAL CODING METHOD AND APPARATUS, AND ENCODER

(71) Applicant: HUAWEI TECHNOLOGIES CO., LTD., Shenzhen (CN)

(72) Inventors: Yuan Gao, Beijing (CN); Shuai Liu, Beijing (CN); Bin Wang, Shenzhen (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 228 days.

This patent is subject to a terminal disclaimer.

(21) Appl. No.: 18/511,191

(22) Filed: Nov. 16, 2023

(65) Prior Publication Data

US 2024/0087580 A1 Mar. 14, 2024

Related U.S. Application Data

(63) Continuation of application No. PCT/CN2022/091558, filed on May 7, 2022.

(30) Foreign Application Priority Data

May 17, 2021 (CN) ......................... 202110535832.3

(51) Int. Cl.
*G10L 19/008* (2013.01)
*G10L 19/02* (2013.01)
(Continued)

(52) U.S. Cl.
CPC ........ *G10L 19/008* (2013.01); *G10L 19/0204* (2013.01); *G10L 19/167* (2013.01); *H04S 7/00* (2013.01); *H04S 2420/11* (2013.01)

(58) Field of Classification Search
CPC . G10L 19/008; G10L 19/0204; G10L 19/167; G10L 19/005; G10L 19/02;
(Continued)

(56) References Cited

U.S. PATENT DOCUMENTS 9,473,870 B2 * 10/2016 Sen ......................... H04S 3/002
9,881,628 B2 * 1/2018 Kim ...................... G10L 19/008
(Continued)

FOREIGN PATENT DOCUMENTS

CN 102547549 A 7/2012
CN 106463130 A 2/2017
(Continued)

*Primary Examiner* — Paras D Shah
*Assistant Examiner* — Nadira Sultana
(74) *Attorney, Agent, or Firm* — WOMBLE BOND DICKINSON (US) LLP

(57) ABSTRACT

This application discloses a three-dimensional audio signal coding method. After obtaining a fourth quantity of coefficients for a current frame of a three-dimensional audio signal and frequency domain feature values of the fourth quantity of coefficients, an encoder selects a third quantity of representative coefficients from the fourth quantity of coefficients based on the frequency domain feature values of the fourth quantity of coefficients, and selects a second quantity of representative virtual speakers for the current frame from a candidate virtual speaker set based on the third quantity of representative coefficients, and then encodes the current frame based on the second quantity of representative virtual speakers for the current frame to obtain a bitstream. The encoder selects the representative virtual speakers from the candidate virtual speaker set by using a small quantity of representative coefficients to represent all coefficients.

20 Claims, 14 Drawing Sheets

(51) Int. Cl.
*G10L 19/16* (2013.01)
*H04S 7/00* (2006.01)

(58) Field of Classification Search
CPC .......... H04S 7/00; H04S 2420/11; H04S 5/00; H04S 3/002
See application file for complete search history.

(56) References Cited

U.S. PATENT DOCUMENTS

| | | | | |
|---|---|---|---|---|
| 10,972,851 | B2 * | 4/2021 | Song | H04S 5/00 |
| 10,984,803 | B2 * | 4/2021 | Sung | G10L 19/005 |
| 11,289,102 | B2 * | 3/2022 | Liu | G10L 19/0204 |
| 12,112,765 | B2 * | 10/2024 | Edler | G10L 19/02 |
| 2014/0016802 | A1 | 1/2014 | Sen | |
| 2016/0255454 | A1 * | 9/2016 | Mcgrath | H04S 5/005 381/2 |
| 2019/0239015 | A1 * | 8/2019 | Schevciw | H04S 3/006 |
| 2020/0013426 | A1 * | 1/2020 | Sen | G10L 21/055 |

FOREIGN PATENT DOCUMENTS

| | | | | |
|---|---|---|---|---|
| CN | 107147975 | A | 9/2017 | |
| CN | 114582356 | A | 6/2022 | |
| EP | 2934025 | A1 | 10/2015 | |
| EP | 2963948 | A1 * | 1/2016 | H04S 3/008 |

* cited by examiner (a)

(b)

THREE-DIMENSIONAL AUDIO SIGNAL CODING METHOD AND APPARATUS, AND ENCODER

CROSS-REFERENCE TO RELATED APPLICATIONS

This application is a continuation of International Application No. PCT/CN2022/091558, filed on May 7, 2022, which claims priority to Chinese Patent Application No. 202110535832.3, filed on May 17, 2021. The disclosures of the aforementioned applications are hereby incorporated by reference in their entireties.

TECHNICAL FIELD

This application relates to the multimedia field, and in particular, to a three-dimensional audio signal coding method and apparatus, and an encoder.

BACKGROUND

With rapid development of high-performance computers and signal processing technologies, listeners have increasingly high requirements for voice and audio experience. Immersive audio can satisfy people's requirements in this aspect. For example, a three-dimensional (3D) audio technology is widely used in wireless communication (for example, 4G/5G) voice, virtual reality/augmented reality, media audio, and other aspects. The three-dimensional audio technology is an audio technology for obtaining, processing, transmitting, rendering, and playing back sound and three-dimensional sound field information in the real world, to provide the sound with a strong sense of space, envelopment, and immersion. This provides the listeners with extraordinary "immersive" auditory experience.

Usually, an acquisition device (for example, a microphone) acquires a large amount of data to record three-dimensional sound field information, and transmits a three-dimensional audio signal to a playback device (for example, a speaker or a headset), so that the playback device plays three-dimensional audio. Because the three-dimensional sound field information includes a large amount of data, a large amount of storage space is required for storing the data, and high bandwidth is required for transmitting the three-dimensional audio signal. To resolve the foregoing problems, the three-dimensional audio signal may be compressed, and compressed data may be stored or transmitted. Currently, an encoder may compress the three-dimensional audio signal by using a plurality of preconfigured virtual speakers. However, calculation complexity of performing compression coding on the three-dimensional audio signal by the encoder is high. Therefore, how to reduce calculation complexity of performing compression coding on a three-dimensional audio signal is an urgent problem to be resolved.

SUMMARY

This application provides a three-dimensional audio signal coding method and apparatus, and an encoder, to reduce calculation complexity of performing compression coding on a three-dimensional audio signal.

According to a first aspect, this application provides a three-dimensional audio signal encoding method. After obtaining a fourth quantity of coefficients for a current frame of a three-dimensional audio signal and frequency domain feature values of the fourth quantity of coefficients, an encoder selects a third quantity of representative coefficients from the fourth quantity of coefficients based on the frequency domain feature values of the fourth quantity of coefficients, selects a second quantity of representative virtual speakers for the current frame from a candidate virtual speaker set based on the third quantity of representative coefficients, and then encodes the current frame based on the second quantity of representative virtual speakers for the current frame to obtain a bitstream. The fourth quantity of coefficients include the third quantity of representative coefficients. The third quantity is less than the fourth quantity. This indicates that the third quantity of representative coefficients are some of the fourth quantity of coefficients.

The current frame of the three-dimensional audio signal is a higher order ambisonics (HOA) signal, and the frequency domain feature value of the coefficient is determined based on a coefficient of the HOA signal.

The encoder selects some coefficients from all coefficients for the current frame as representative coefficients, and selects the representative virtual speakers from the candidate virtual speaker set by using a small quantity of representative coefficients to represent all the coefficients for the current frame. This effectively reduces complexity of calculation performed by the encoder to search for a virtual speaker, and therefore reduces calculation complexity of performing compression coding on the three-dimensional audio signal, and reduces calculation load of the encoder.

In addition, when encoding the current frame based on the second quantity of representative virtual speakers for the current frame to obtain a bitstream, the encoder generates a virtual speaker signal based on the current frame and the second quantity of representative virtual speakers for the current frame, and encodes the virtual speaker signal to obtain the bitstream.

Because a frequency domain feature value of a coefficient for the current frame represents a sound field characteristic of the three-dimensional audio signal, the encoder selects, based on the frequency domain feature value of the coefficient for the current frame, a representative coefficient for the current frame that has a representative sound field component. A representative virtual speaker for the current frame selected from the candidate virtual speaker set by using the representative coefficient can fully represent the sound field characteristic of the three-dimensional audio signal. This further improves accuracy of generating, by the encoder, the virtual speaker signal by performing compression coding on the to-be-encoded three-dimensional audio signal by using the representative virtual speaker for the current frame, and helps increase a compression ratio for performing compression coding on the three-dimensional audio signal, and reduce bandwidth occupied by the encoder for transmitting the bitstream.

In a possible embodiment, when selecting a third quantity of representative coefficients from the fourth quantity of coefficients based on the frequency domain feature values of the fourth quantity of coefficients, the encoder selects, based on the frequency domain feature values of the fourth quantity of coefficients, a representative coefficient from at least one subband included in a spectral range indicated by the fourth quantity of coefficients, to obtain the third quantity of representative coefficients.

For example, when selecting, based on the frequency domain feature values of the fourth quantity of coefficients, a representative coefficient from at least one subband included in a spectral range indicated by the fourth quantity of coefficients, to obtain the third quantity of representative coefficients, the encoder selects Z representative coefficients from each of the at least one subband based on a frequency domain feature value of a coefficient in each subband, to obtain the third quantity of representative coefficients, where Z is a positive integer. The encoder selects a representative coefficient based on a frequency domain feature value of a coefficient in a spectral range indicated by all coefficients for the current frame. This ensures that a representative coefficient is selected from each subband, and improves equalization for selecting, by the encoder, a representative coefficient from the spectral range indicated by all the coefficients for the current frame.

For another example, when the at least one subband includes at least two subbands, when selecting, based on the frequency domain feature values of the fourth quantity of coefficients, a representative coefficient from at least one subband included in a spectral range indicated by the fourth quantity of coefficients, to obtain the third quantity of representative coefficients, the encoder determines a weight of each of the at least two subbands based on a frequency domain feature value of a first candidate coefficient in each subband; adjusts a frequency domain feature value of a second candidate coefficient in each subband based on the weight of each subband, to obtain an adjusted frequency domain feature value of the second candidate coefficient in each subband, where the first candidate coefficient and the second candidate coefficient are some coefficients in the subband; and determines the third quantity of representative coefficients based on an adjusted frequency domain feature value of a second candidate coefficient in the at least two subbands and a frequency domain feature value of a coefficient other than the second candidate coefficient in the at least two subbands. In this way, the encoder adjusts, based on a weight of a subband, a probability that a coefficient in the subband is selected. This further improves accuracy of representing, by a representative coefficient selected by the encoder, coefficients in all subbands in terms of sound field distribution and audio characteristics.

The encoder may divide a spectral range through unequal division to obtain at least two subbands. In this case, the at least two subbands include different quantities of coefficients. Alternatively, the encoder may divide a spectral range through equal division to obtain at least two subbands. In this case, the at least two subbands each include a same quantity of coefficients.

In another possible embodiment, when selecting a second quantity of representative virtual speakers for the current frame from a candidate virtual speaker set based on the third quantity of representative coefficients, the encoder determines a first quantity of virtual speakers and a first quantity of vote values based on the third quantity of representative coefficients for the current frame, the candidate virtual speaker set, and a quantity of rounds of voting; and selects the second quantity of representative virtual speakers for the current frame from the first quantity of virtual speakers based on the first quantity of vote values. The second quantity is less than the first quantity. This indicates that the second quantity of representative virtual speakers for the current frame are some virtual speakers in the candidate virtual speaker set. It can be understood that the virtual speakers are in a one-to-one correspondence with the vote values. For example, the first quantity of virtual speakers include a first virtual speaker, the first quantity of vote values include a vote value of the first virtual speaker, and the first virtual speaker corresponds to the vote value of the first virtual speaker. The vote value of the first virtual speaker represents a priority of the first virtual speaker. The candidate virtual speaker set includes a fifth quantity of virtual speakers. The fifth quantity of virtual speakers include the first quantity of virtual speakers. The first quantity is less than or equal to the fifth quantity. The quantity of rounds of voting is an integer greater than or equal to 1, and the quantity of rounds of voting is less than or equal to the fifth quantity. The second quantity is preset, or the second quantity is determined based on the current frame.

Currently, during searching for a virtual speaker, the encoder uses a result of correlation calculation between the to-be-encoded three-dimensional audio signal and a virtual speaker as a measurement indicator for selecting a virtual speaker. In addition, if the encoder transmits one virtual speaker for each coefficient, an objective of efficient data compression cannot be achieved, and heavy calculation load is imposed on the encoder. In the virtual speaker selection method provided in this embodiment of this application, the encoder votes for each virtual speaker in the candidate virtual speaker set by using a small quantity of representative coefficients to represent all coefficients for the current frame, and selects a representative virtual speaker for the current frame based on a vote value. Further, the encoder compresses and encodes the to-be-coded three-dimensional audio signal by using the representative virtual speaker for the current frame. This not only effectively increases a compression ratio for performing compression coding on the three-dimensional audio signal, but also reduces complexity of calculation performed by the encoder to search for a virtual speaker, and therefore reduces calculation complexity of performing compression coding on the three-dimensional audio signal, and reduces calculation load of the encoder.

The second quantity represents a quantity of representative virtual speakers for the current frame that are selected by the encoder. A larger second quantity indicates a larger quantity of representative virtual speakers for the current frame and a larger amount of sound field information of the three-dimensional audio signal. A smaller second quantity indicates a smaller quantity of representative virtual speakers for the current frame and a smaller amount of sound field information of the three-dimensional audio signal. Therefore, the second quantity may be set to control the quantity of representative virtual speakers for the current frame that are selected by the encoder. For example, the second quantity may be preset. For another example, the second quantity may be determined based on the current frame. For example, a value of the second quantity may be 1, 2, 4, or 8.

In another possible embodiment, when selecting the second quantity of representative virtual speakers for the current frame from the first quantity of virtual speakers based on the first quantity of vote values, the encoder obtains, based on the first quantity of vote values and a sixth quantity of final vote values for a previous frame, a seventh quantity of final vote values for the current frame that correspond to a seventh quantity of virtual speakers and the current frame; and selects the second quantity of representative virtual speakers for the current frame from the seventh quantity of virtual speakers based on the seventh quantity of final vote values for the current frame. The second quantity is less than the seventh quantity. This indicates that the second quantity of representative virtual speakers for the current frame are some of the seventh quantity of virtual speakers. The seventh quantity of virtual speakers include the first quantity of virtual speakers, and the seventh quantity of virtual speakers include a sixth quantity of virtual speakers. Virtual speakers included in the sixth quantity of virtual speakers are representative virtual speakers for the previous frame of the three-dimensional audio signal that are used to encode the previous frame. A sixth quantity of virtual speakers included in a representative virtual speaker set for the previous frame are in a one-to-one correspondence with the sixth quantity of final vote values for the previous frame.

During searching for a virtual speaker, because a location of a real sound source does not necessarily coincide with a location of a virtual speaker, a virtual speaker and a real sound source are not necessarily able to form a one-to-one correspondence. In addition, in an actual complex scenario, a virtual speaker set including a limited quantity of virtual speakers may not be able to represent all sound sources in a sound field. In this case, virtual speakers found in different frames may frequently change, and this change significantly affects auditory experience of a listener, and causes significant discontinuity and noise in a decoded and reconstructed three-dimensional audio signal. In the virtual speaker selection method provided in this embodiment of this application, a representative virtual speaker for a previous frame is inherited. To be specific, for virtual speakers with a same number, an initial vote value for the current frame is adjusted by using a final vote value for the previous frame, so that the encoder more tends to select a representative virtual speaker for the previous frame. This alleviates frequent changes of virtual speakers in different frames, enhances continuity of signal orientations between frames, improves stability of a sound image of a reconstructed three-dimensional audio signal, and ensures sound quality of the reconstructed three-dimensional audio signal.

In another possible embodiment, the encoder obtains a first correlation between the current frame and the representative virtual speaker set for the previous frame; and if the first correlation does not satisfy a reuse condition, obtains the fourth quantity of coefficients for the current frame of the three-dimensional audio signal and the frequency domain feature values of the fourth quantity of coefficients. The representative virtual speaker set for the previous frame includes the sixth quantity of virtual speakers. Virtual speakers included in the sixth quantity of virtual speakers are representative virtual speakers for the previous frame of the three-dimensional audio signal that are used to encode the previous frame. The first correlation is used to determine whether to reuse the representative virtual speaker set for the previous frame when the current frame is encoded.

In this way, the encoder may first determine whether to reuse the representative virtual speaker set for the previous frame to encode the current frame. If the encoder reuses the representative virtual speaker set for the previous frame to encode the current frame, the encoder does not need to perform a virtual speaker search process again. This effectively reduces complexity of calculation performed by the encoder to search for a virtual speaker, and therefore reduces calculation complexity of performing compression coding on the three-dimensional audio signal, and reduces calculation load of the encoder. In addition, this can further alleviate frequent changes of virtual speakers in different frames, enhance orientation continuity between frames, improve stability of a sound image of a reconstructed three-dimensional audio signal, and ensure sound quality of the reconstructed three-dimensional audio signal. If the encoder cannot reuse the representative virtual speaker set for the previous frame to encode the current frame, the encoder reselects a representative coefficient, votes for each virtual speaker in the candidate virtual speaker set by using a representative coefficient for the current frame, and selects a representative virtual speaker for the current frame based on a vote value, to reduce calculation complexity of performing compression coding on the three-dimensional audio signal, and reduce calculation load of the encoder.

In an embodiment, the encoder may further acquire the current frame of the three-dimensional audio signal, to perform compression encoding on the current frame of the three-dimensional audio signal to obtain the bitstream, and transmit the bitstream to a decoder side.

According to a second aspect, this application provides a three-dimensional audio signal encoding apparatus. The apparatus includes modules for performing the three-dimensional audio signal encoding method according to any one of the first aspect or the possible designs of the first aspect. For example, the three-dimensional audio signal encoding apparatus includes a coefficient selection module, a virtual speaker selection module, and an encoding module. The coefficient selection module is configured to obtain a fourth quantity of coefficients for a current frame of a three-dimensional audio signal and frequency domain feature values of the fourth quantity of coefficients. The coefficient selection module is further configured to select a third quantity of representative coefficients from the fourth quantity of coefficients based on the frequency domain feature values of the fourth quantity of coefficients, where the third quantity is less than the fourth quantity. The virtual speaker selection module is configured to select a second quantity of representative virtual speakers for the current frame from a candidate virtual speaker set based on the third quantity of representative coefficients. The encoding module is configured to encode the current frame based on the second quantity of representative virtual speakers for the current frame to obtain a bitstream. These modules may perform corresponding functions in the method example in the first aspect. For details, refer to the detailed descriptions in the method example. Details are not described herein again.

According to a third aspect, this application provides an encoder. The encoder includes at least one processor and a memory. The memory is configured to store a group of computer instructions. When the processor executes the group of computer instructions, operations of the three-dimensional audio signal encoding method according to any one of the first aspect or the possible embodiments of the first aspect are performed.

According to a fourth aspect, this application provides a system. The system includes the encoder according to the third aspect and a decoder. The encoder is configured to perform operations of the three-dimensional audio signal encoding method according to any one of the first aspect or the possible embodiments of the first aspect. The decoder is configured to decode a bitstream generated by the encoder.

According to a fifth aspect, this application provides a computer-readable storage medium, including computer software instructions. When the computer software instructions run on an encoder, the encoder is enabled to perform operations of the method according to any one of the first aspect or the possible embodiments of the first aspect.

According to a sixth aspect, this application provides a computer program product. When the computer program product runs on an encoder, the encoder is enabled to perform operations of the method according to any one of the first aspect or the possible embodiments of the first aspect.

In this application, based on the embodiments provided in the foregoing aspects, the embodiments may be further combined to provide more embodiments.

DESCRIPTION OF EMBODIMENTS

Figure 1:
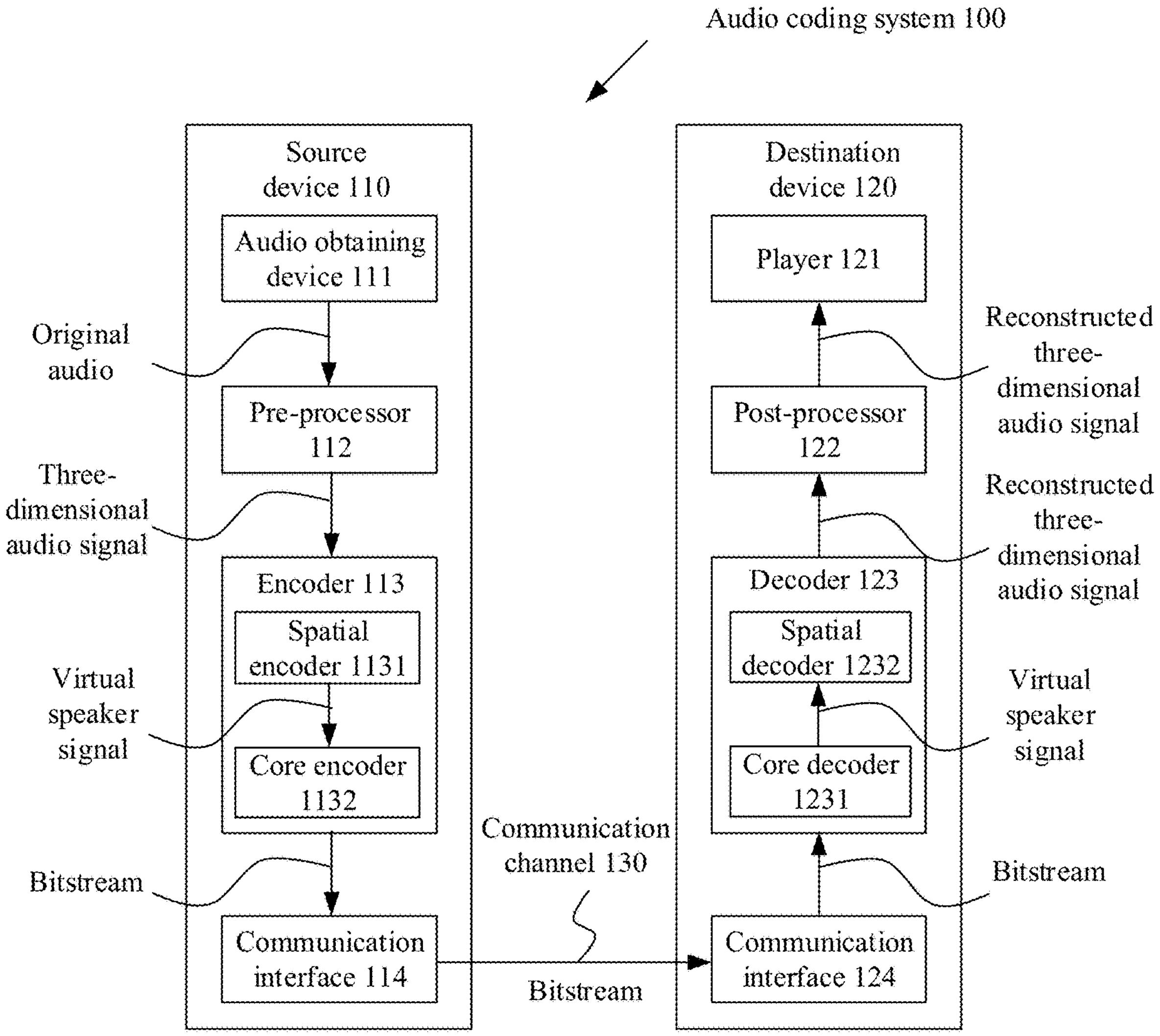
FIG. 1 is a schematic diagram of a structure of an audio coding system according to an embodiment of this application.

For clarity and brevity of description of the following embodiments, a related technology is briefly described first.

Sound is a continuous wave generated through vibration of an object. An object that vibrates to produce a sound wave is referred to as a sound source. During transmission of the sound wave through a medium (for example, air, solid, or liquid), an auditory organ of a human or an animal can sense sound.

Features of the sound wave include pitch, sound intensity, and timbre. The pitch indicates highness/lowness of sound. The sound intensity indicates a volume of sound. The sound intensity may also be referred to as loudness or a volume. A unit of the sound intensity is decibel (dB). The timbre is also referred to as sound quality.

A frequency of the sound wave determines a value of the pitch. A higher frequency indicates higher pitch. A quantity of times of vibration performed by an object within one second is referred to as a frequency. A unit of the frequency is hertz (Hz). A frequency of sound that can be recognized by human ears ranges from 20 Hz to 20000 Hz.

An amplitude of the sound wave determines the sound intensity. A larger amplitude indicates higher sound intensity. A shorter distance from a sound source indicates higher sound intensity.

A waveform of the sound wave determines the timbre. The waveform of the sound wave includes a square wave, a sawtooth wave, a sine wave, a pulse wave, and the like.

Sound may be classified into regular sound and irregular sound based on the features of the sound wave. The irregular sound is sound produced by a sound source through irregular vibration. The irregular sound is, for example, noise that affects people's work, study, rest, and the like. The regular sound is sound produced by a sound source through regular vibration. The regular sound includes voice and music. When the sound is represented by electricity, the regular sound is an analog signal that changes continuously in time-frequency domain. The analog signal may be referred to as an audio signal. The audio signal is an information carrier that carries voice, music, and sound effect.

A human auditory system has a capability of distinguishing location distribution of sound sources in space. Therefore, when hearing sound in the space, a listener can sense an orientation of the sound in addition to a pitch, sound intensity, and timbre of the sound.

As people pay attention to auditory experience and have increasingly high requirements for quality, to enhance a sense of depth, a sense of immersion, and a sense of space of sound, a three-dimensional audio technology emerges correspondingly. In this way, a listener not only feels sound produced by sound sources from the front, rear, left, and right, but also feels that space in which the listener is located is surrounded by a spatial sound field ("sound field" for short) produced by the sound sources, and feels that the sound spreads around. This creates "immersive" sound effect in which the listener feels like being in a cinema, a concert hall, or the like.

In the three-dimensional audio technology, space outside a human ear is assumed as a system, and a signal received at an eardrum is a three-dimensional audio signal that is output by the system outside the ear by filtering sound produced by a sound source. For example, the system outside the human ear may be defined as a system impulse response h(n), any sound source may be defined as x(n), and the signal received at the eardrum is a convolution result of x(n) and h(n). The three-dimensional audio signal in embodiments of this application may be a higher order ambisonics (HOA) signal. Three-dimensional audio may also be referred to as three-dimensional sound effect, spatial audio, three-dimensional sound field reconstruction, virtual 3D audio, binaural audio, or the like.

It is well known that, when a sound wave is transmitted in an ideal medium, a wave velocity is k=w/c, and an angular frequency is w=2πf, where f is a frequency of the sound wave, and c is a sound velocity. Sound pressure P satisfies formula (1), where $\nabla^2$ is a Laplace operator.

$$\nabla^2 p + k^2 p = 0 \quad \text{Formula (1)}$$

It is assumed that the spatial system outside the human ear is a sphere, a listener is at a center of the sphere, sound transmitted from the outside of the sphere has a projection on a spherical surface, and sound outside the sphere is filtered out. It is assumed that a sound source is distributed on the spherical surface, and a sound field produced by the sound source on the spherical surface is used to fit a sound field produced by an original sound source. That is, the three-dimensional audio technology is a sound field fitting method. Specifically, the equation in the formula (1) is solved in a spherical coordinate system. In a passive spherical region, the equation in the formula (1) is solved into the following formula (2):

$$p(r, \theta, \varphi, k) = s\sum_{m=0}^{\infty}(2m+1)j^m j_m^{kr}(kr)\sum_{0\le n\le m,\sigma=\pm1} Y_{m,n}^{\sigma}(\theta_s, \varphi_s)Y_{m,n}^{\sigma}(\theta, \varphi) \quad \text{Formula (2)}$$

r indicates a radius of the sphere, θ indicates an azimuth, φ indicates an elevation, k indicates a wave velocity, s indicates an amplitude of an ideal planar wave, and m indicates a sequence number of an order of a three-dimensional audio signal (or referred to as a sequence number of an order of an HOA signal).

$$j^m j_m^{kr}(kr)$$

indicates a spherical Bessel function, and the spherical Bessel function is also referred to as a radial basis function, where the first j indicates an imaginary unit, and $$(2m+1)j^m j_m^{kr}(kr)$$

does not change with an angle.

$$Y_{m,n}^{\sigma}(\theta, \varphi)$$

indicates a spherical harmonic function in θ and φ directions, and $$Y_{m,n}^{\sigma}(\theta_s, \varphi_s)$$

indicates a spherical harmonic function in a sound source direction. A three-dimensional audio signal coefficient satisfies formula (3):

$$B_{m,n}^{\sigma} = s \cdot Y_{m,n}^{\sigma}(\theta_s, \varphi_s) \quad \text{Formula (3)}$$

The formula (3) is substituted into the formula (2), and the formula (2) may be transformed into formula (4):

$$p(r, \theta, \varphi, k) = \sum_{m=0}^{\infty} j^m j_m^{kr}(kr)\sum_{0\le n\le m,\sigma=\pm1} B_{m,n}^{\sigma} Y_{m,n}^{\sigma}(\theta, \varphi) \quad \text{Formula (4)}$$

$$B_{m,n}^{\sigma}$$

indicates an $N^{th}$-order three-dimensional audio signal coefficient, and is used to approximately describe a sound field. The sound field is a region in which a sound wave exists in a medium. N is an integer greater than or equal to 1. For example, a value of N is an integer ranging from 2 to 6. The three-dimensional audio signal coefficient in embodiments of this application may be an HOA coefficient or an ambisonics (ambisonics) coefficient.

The three-dimensional audio signal is an information carrier that carries spatial location information of a sound source in a sound field, and describes a sound field of a listener in space. The formula (4) indicates that the sound field may be expanded on the spherical surface based on the spherical harmonic function, that is, the sound field may be decomposed into a plurality of superposed planar waves. Therefore, the sound field described by the three-dimensional audio signal may be expressed by a plurality of superposed planar waves, and the sound field may be reconstructed by using the three-dimensional audio signal coefficient.

Compared with a 5.1-channel audio signal or a 7.1-channel audio signal, an $N^{th}$-order HOA signal has $(N+1)^2$ channels, and therefore the HOA signal includes a larger amount of data for describing spatial information of a sound field. If an acquisition device (for example, a microphone) transmits the three-dimensional audio signal to a playback device (for example, a speaker), high bandwidth needs to be consumed. Currently, an encoder may perform compression encoding on a three-dimensional audio signal through spatial squeezed surround audio coding (S3AC) or directional audio coding (DirAC) to obtain a bitstream, and transmit the bitstream to the playback device. The playback device decodes the bitstream, reconstructs the three-dimensional audio signal, and plays a reconstructed three-dimensional audio signal. This reduces an amount of data and bandwidth usage during transmission of the three-dimensional audio signal to the playback device. However, complexity of calculation performed by the encoder to perform compression encoding on the three-dimensional audio signal is high, and excessive computing resources of the encoder are occupied. Therefore, how to reduce calculation complexity of performing compression coding on a three-dimensional audio signal is an urgent problem to be resolved.

Embodiments of this application provide an audio coding technology, and in particular, provide a three-dimensional audio coding technology oriented to a three-dimensional audio signal, and specifically, provide a coding technology for representing a three-dimensional audio signal by using a small quantity of channels, to improve a conventional audio coding system. Audio coding (or usually referred to as coding) includes two parts: audio encoding and audio decoding. Audio encoding is performed on a source side, and usually includes: processing (for example, compressing) original audio to reduce an amount of data for representing the original audio, to achieve more efficient storage and/or transmission. Audio decoding is performed on a destination side, and usually includes: performing inverse processing relative to an encoder, to reconstruct original audio. An encoding part and a decoding part are also collectively referred to as codec. The following describes embodiments of this application in detail with reference to accompanying drawings.

FIG. 1 is a schematic diagram of a structure of an audio coding system according to an embodiment of this application. The audio coding system 100 includes a source device 110 and a destination device 120. The source device 110 is configured to perform compression encoding on a three-dimensional audio signal to obtain a bitstream, and transmit the bitstream to the destination device 120. The destination device 120 decodes the bitstream, reconstructs the three-dimensional audio signal, and plays a reconstructed three-dimensional audio signal.

Specifically, the source device 110 includes an audio obtaining device 111, a pre-processor 112, an encoder 113, and a communication interface 114.

The audio obtaining device 111 is configured to obtain original audio. The audio obtaining device 111 may be any type of audio acquisition device for acquiring real-world sound, and/or any type of audio generation device. For example, the audio obtaining device 111 is a computer audio processor for generating computer audio. The audio obtaining device 111 may alternatively be any type of memory or internal memory for storing audio. The audio includes real-world sound, virtual-scene (for example, VR or augmented reality (AR)) sound, and/or any combination thereof.

The pre-processor 112 is configured to receive the original audio acquired by the audio obtaining device 111, and pre-process the original audio to obtain the three-dimensional audio signal. For example, the pre-processing performed by the pre-processor 112 includes channel switching, audio format conversion, denoising, or the like.

The encoder 113 is configured to receive the three-dimensional audio signal generated by the pre-processor 112, and perform compression encoding on the three-dimensional audio signal to obtain the bitstream. For example, the encoder 113 may include a spatial encoder 1131 and a core encoder 1132. The spatial encoder 1131 is configured to select (or referred to as searching for) a virtual speaker from a candidate virtual speaker set based on the three-dimensional audio signal, and generate a virtual speaker signal based on the three-dimensional audio signal and the virtual speaker. The virtual speaker signal may also be referred to as a playback signal. The core encoder 1132 is configured to encode the virtual speaker signal to obtain the bitstream.

The communication interface 114 is configured to receive the bitstream generated by the encoder 113, and send the bitstream to the destination device 120 through a communication channel 130, so that the destination device 120 reconstructs the three-dimensional audio signal based on the bitstream.

The destination device 120 includes a player 121, a post-processor 122, a decoder 123, and a communication interface 124.

The communication interface 124 is configured to receive the bitstream sent by the communication interface 114, and transmit the bitstream to the decoder 123, so that the decoder 123 reconstructs the three-dimensional audio signal based on the bitstream.

The communication interface 114 and the communication interface 124 may be configured to send or receive related data of the original audio through a direct communication link between the source device 110 and the destination device 120, for example, a direct wired or wireless connection, or any type of network such as a wired network, a wireless network, or any combination thereof, or any type of private network or public network or any combination thereof.

The communication interface 114 and the communication interface 124 each may be configured as a unidirectional communication interface indicated by an arrow, in FIG. 1, that corresponds to the communication channel 130 and that is directed from the source device 110 to the destination device 120, or a bidirectional communication interface, and may be configured to: send and receive messages or the like to establish a connection, determine and exchange any other information related to a communication link and/or data transmission such as transmission of an encoded bitstream, and the like.

The decoder 123 is configured to decode the bitstream and reconstruct the three-dimensional audio signal. For example, the decoder 123 includes a core decoder 1231 and a spatial decoder 1232. The core decoder 1231 is configured to decode the bitstream to obtain the virtual speaker signal. The spatial decoder 1232 is configured to reconstruct the three-dimensional audio signal based on the candidate virtual speaker set and the virtual speaker signal to obtain a reconstructed three-dimensional audio signal.

The post-processor 122 is configured to receive the reconstructed three-dimensional audio signal generated by the decoder 123, and post-process the reconstructed three-dimensional audio signal. For example, the post-processing performed by the post-processor 122 includes audio rendering, loudness normalization, user interaction, audio format conversion, denoising, or the like.

The player 121 is configured to play reconstructed sound based on the reconstructed three-dimensional audio signal.

It should be noted that the audio obtaining device 111 and the encoder 113 may be integrated in one physical device, or may be disposed in different physical devices. This is not limited. For example, the source device 110 shown in FIG. 1 includes the audio obtaining device 111 and the encoder 113. This indicates that the audio obtaining device 111 and the encoder 113 are integrated in one physical device. In this case, the source device 110 may also be referred to as an acquisition device. For example, the source device 110 is a media gateway of a radio access network, a media gateway of a core network, a transcoding device, a media resource server, an AR device, a VR device, a microphone, or another audio acquisition device. If the source device 110 does not include the audio obtaining device 111, it indicates that the audio obtaining device 111 and the encoder 113 are two different physical devices, and the source device 110 may obtain original audio from another device (for example, an audio acquisition device or an audio storage device).

In addition, the player 121 and the decoder 123 may be integrated in one physical device, or may be disposed in different physical devices. This is not limited. For example, the destination device 120 shown in FIG. 1 includes the player 121 and the decoder 123. This indicates that the player 121 and the decoder 123 are integrated in one physical device. In this case, the destination device 120 may also be referred to as a playback device, and the destination device 120 has a decoding function and a function of playing reconstructed audio. For example, the destination device 120 is a speaker, a headset, or another audio play device. If the destination device 120 does not include the player 121, it indicates that the player 121 and the decoder 123 are two different physical devices. After decoding the bitstream and reconstructing the three-dimensional audio signal, the destination device 120 transmits the reconstructed three-dimensional audio signal to another playing device (for example, a speaker or a headset), and the another playing device plays the reconstructed three-dimensional audio signal.

In addition, as shown in FIG. 1, the source device 110 and the destination device 120 may be integrated in one physical device, or may be disposed in different physical devices. This is not limited.

Figure 2:
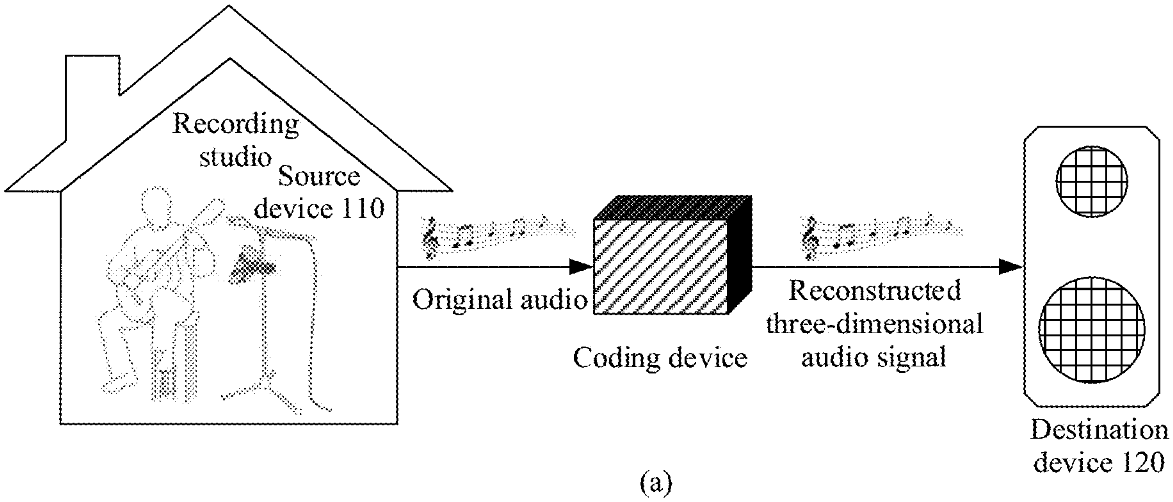
FIG. 2 is a schematic diagram of a scenario of an audio coding system according to an embodiment of this application.
Figure 2:
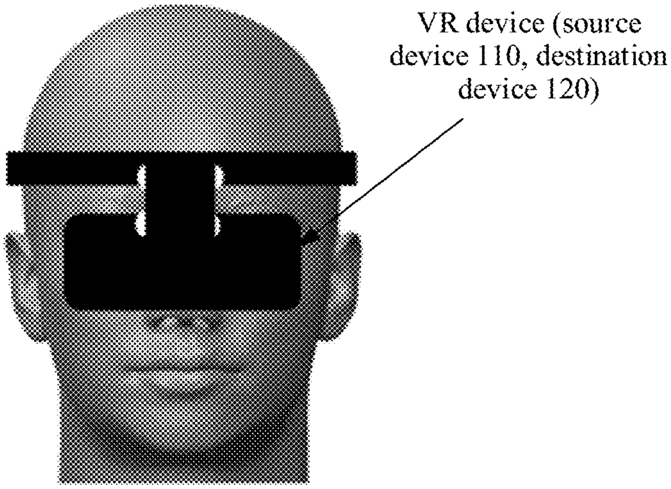

For example, as shown in (a) in FIG. 2, the source device 110 may be a microphone in a recording studio, and the destination device 120 may be a speaker. The source device 110 may acquire original audio of various musical instruments, and transmit the original audio to a codec device. The codec device performs codec processing on the original audio to obtain a reconstructed three-dimensional audio signal. The destination device 120 plays the reconstructed three-dimensional audio signal. For another example, the source device 110 may be a microphone in a terminal device, and the destination device 120 may be a headset. The source device 110 may acquire external sound or audio synthesized by the terminal device.

For another example, as shown in (b) in FIG. 2, the source device 110 and the destination device 120 are integrated in a virtual reality (VR) device, an augmented reality (AR) device, a mixed reality (MR) device, or an extended reality (XR) device. In this case, the VR/AR/MR/XR device has functions of acquiring original audio, playing back audio, and performing coding. The source device 110 may acquire sound produced by a user and sound produced by a virtual object in a virtual environment in which the user is located.

In these embodiments, the source device 110 or a corresponding function thereof, and the destination device 120 or a corresponding function thereof may be implemented by using same hardware and/or software, separate hardware and/or software, or any combination thereof. Based on the descriptions, existence and division of different units or functions in the source device 110 and/or the destination device 120 shown in FIG. 1 may vary depending on actual devices and applications. This is clear to a person skilled in the art.

The structure of the audio coding system is merely an example for description. In some possible embodiments, the audio coding system may further include another device. For example, the audio coding system may further include a device-side device or a cloud-side device. After acquiring original audio, the source device 110 pre-processes the original audio to obtain a three-dimensional audio signal, and transmits the three-dimensional audio signal to the device-side device or the cloud-side device, so that the device-side device or the cloud-side device implements a function of encoding and decoding the three-dimensional audio signal.

Figure 3:
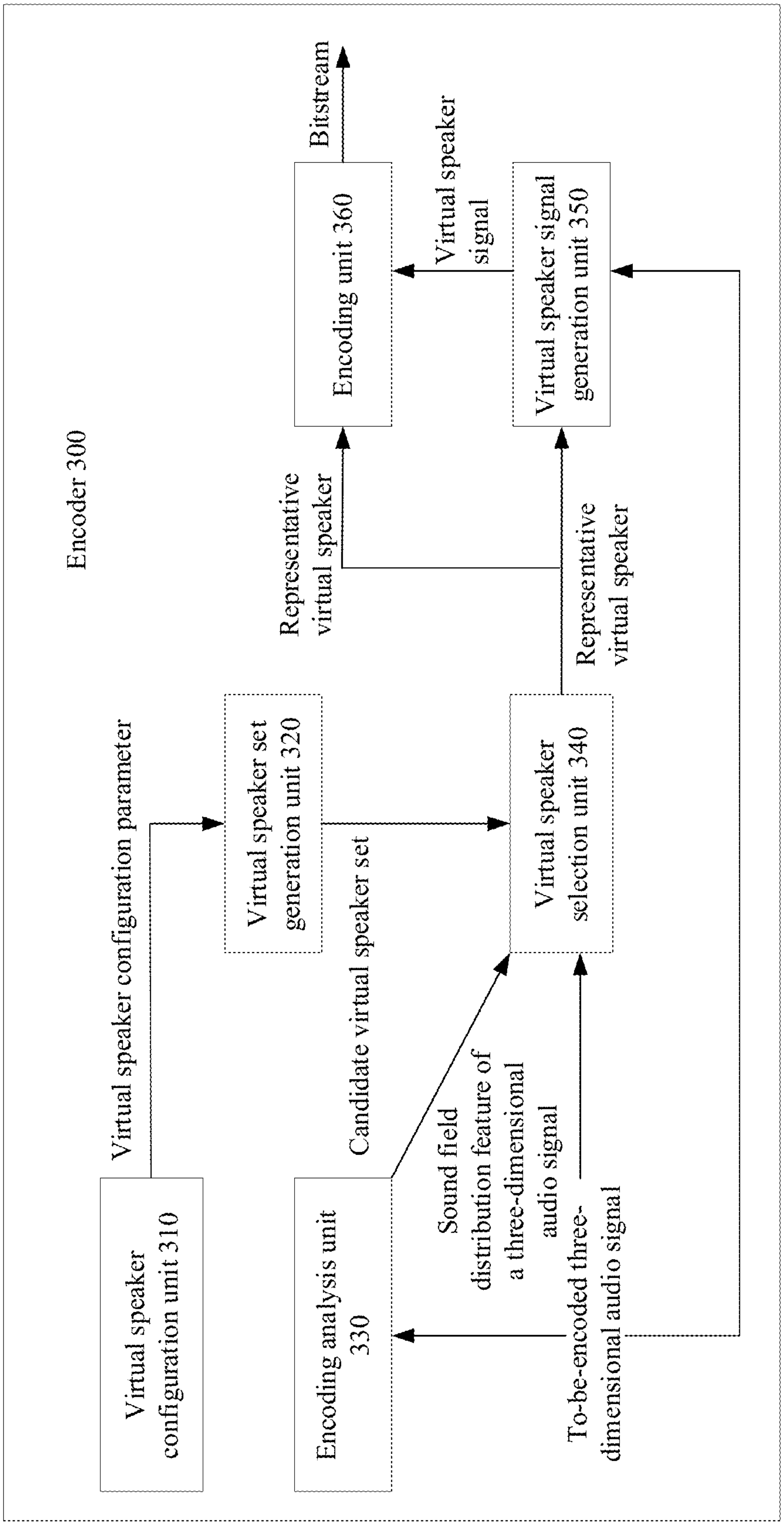
FIG. 3 is a schematic diagram of a structure of an encoder according to an embodiment of this application.

An audio coding method provided in embodiments of this application is mainly applied to an encoder side. A structure of an encoder is described in detail with reference to FIG. 3. As shown in FIG. 3, the encoder 300 includes a virtual speaker configuration unit 310, a virtual speaker set generation unit 320, an encoding analysis unit 330, a virtual speaker selection unit 340, a virtual speaker signal generation unit 350, and an encoding unit 360.

The virtual speaker configuration unit 310 is configured to generate a virtual speaker configuration parameter based on encoder configuration information, to obtain a plurality of virtual speakers. The encoder configuration information includes but is not limited to an order of a three-dimensional audio signal (or usually referred to as an HOA order), an encoding bit rate, user-defined information, and the like. The virtual speaker configuration parameter includes but is not limited to a quantity of virtual speakers, an order of the virtual speaker, location coordinates of the virtual speaker, and the like. For example, the quantity of virtual speakers is 2048, 1669, 1343, 1024, 530, 512, 256, 128, or 64. The order of the virtual speaker may be any one of a second order to a sixth order. The location coordinates of the virtual speaker include an azimuth and an elevation.

The virtual speaker configuration parameter output by the virtual speaker configuration unit 310 is input for the virtual speaker set generation unit 320.

The virtual speaker set generation unit 320 is configured to generate a candidate virtual speaker set based on the virtual speaker configuration parameter, where the candidate virtual speaker set includes a plurality of virtual speakers. Specifically, the virtual speaker set generation unit 320 determines, based on the quantity of virtual speakers, the plurality of virtual speakers included in the candidate virtual speaker set, and determines coefficients for the virtual speakers based on location information (for example, coordinates) of the virtual speakers and orders of the virtual speakers. For example, a method for determining coordinates of a virtual speaker includes but is not limited to: generating a plurality of virtual speakers according to an equidistance rule, or generating a plurality of nonuniformly distributed virtual speakers according to an auditory perception principle; and then generating coordinates of the virtual speakers based on a quantity of virtual speakers.

A coefficient for a virtual speaker may also be generated according to the foregoing principle of generating a three-dimensional audio signal. $\theta_s$ and $\varphi_s$ in the formula (3) are set to location coordinates of a virtual speaker, and $$B_{m,n}^{\sigma}$$

indicates a coefficient for an $N^{th}$-order virtual speaker. The coefficient for the virtual speaker may also be referred to as an ambisonics coefficient.

The encoding analysis unit 330 is configured to perform encoding analysis on the three-dimensional audio signal, for example, analyze sound field distribution features of the three-dimensional audio signal, to be specific, a quantity of sound sources of the three-dimensional audio signal, directivity of the sound source, dispersity of the sound source, and other features.

The coefficients for the plurality of virtual speakers included in the candidate virtual speaker set output by the virtual speaker set generation unit 320 are input for the virtual speaker selection unit 340.

The sound field distribution features of the three-dimensional audio signal that are output by the encoding analysis unit 330 are input for the virtual speaker selection unit 340.

The virtual speaker selection unit 340 is configured to determine, based on the to-be-encoded three-dimensional audio signal, the sound field distribution features of the three-dimensional audio signal, and the coefficients for the plurality of virtual speakers, a representative virtual speaker matching the three-dimensional audio signal.

Alternatively, the encoder 300 in this embodiment of this application may not include the encoding analysis unit 330. To be specific, the encoder 300 may not analyze an input signal, and the virtual speaker selection unit 340 determines a representative virtual speaker by using a default configuration. For example, the virtual speaker selection unit 340 determines, based on only the three-dimensional audio signal and the coefficients for the plurality of virtual speakers, a representative virtual speaker matching the three-dimensional audio signal.

The encoder 300 may use, as input for the encoder 300, a three-dimensional audio signal obtained from an acquisition device or a three-dimensional audio signal obtained through synthesis of an artificial audio object. In addition, the three-dimensional audio signal input to the encoder 300 may be a time-domain three-dimensional audio signal or a frequency domain three-dimensional audio signal. This is not limited.

Location information of the representative virtual speaker and a coefficient for the representative virtual speaker that are output by the virtual speaker selection unit 340 are input for the virtual speaker signal generation unit 350 and the encoding unit 360.

The virtual speaker signal generation unit 350 is configured to generate a virtual speaker signal based on the three-dimensional audio signal and attribute information of the representative virtual speaker. The attribute information of the representative virtual speaker includes at least one of the following: the location information of the representative virtual speaker, the coefficient for the representative virtual speaker, and a coefficient for the three-dimensional audio signal. If the attribute information is the location information of the representative virtual speaker, the coefficient for the representative virtual speaker is determined based on the location information of the representative virtual speaker. If the attribute information includes the coefficient for the three-dimensional audio signal, the coefficient for the representative virtual speaker is obtained based on the coefficient for the three-dimensional audio signal. Specifically, the virtual speaker signal generation unit 350 calculates the virtual speaker signal based on the coefficient for the three-dimensional audio signal and the coefficient for the representative virtual speaker.

For example, it is assumed that a matrix A represents a coefficient for a virtual speaker, and a matrix X represents an HOA coefficient for an HOA signal. The matrix X is an inverse matrix of the matrix A. A theoretical optimal solution w is obtained by using a least square method, where W indicates the virtual speaker signal. The virtual speaker signal satisfies formula (5):

$$w = A^{-1}X \qquad \text{Formula (5)}$$

$A^{-1}$ indicates an inverse matrix of the matrix A. A size of the matrix A is (M×C), where C indicates a quantity of representative virtual speakers, and M indicates a quantity of sound channels of an $N^{th}$-order HOA signal. a indicates the coefficient for the representative virtual speaker. A size of the matrix X is (M×L), where L indicates a quantity of coefficients for HOA signals. x indicates the coefficient for the HOA signal. The coefficient for the representative virtual speaker may be an HOA coefficient for the representative virtual speaker or an ambisonics coefficient for the representative virtual speaker. For example, $$A = \begin{bmatrix} a_{11} & \cdots & a_{1C} \\ \vdots & \ddots & \vdots \\ a_{M1} & \cdots & a_{MC} \end{bmatrix}, \text{ and } X = \begin{bmatrix} x_{11} & \cdots & x_{1L} \\ \vdots & \ddots & \vdots \\ x_{M1} & \cdots & x_{ML} \end{bmatrix}.$$

The virtual speaker signal output by the virtual speaker signal generation unit 350 is input for the encoding unit 360.

The encoding unit 360 is configured to perform core encoding on the virtual speaker signal to obtain a bitstream. The core encoding includes but is not limited to transformation, quantization, a psychoacoustic model, noise shaping, bandwidth extension, down-mixing, arithmetic encoding, bitstream generation, and the like.

It should be noted that the spatial encoder 1131 may include the virtual speaker configuration unit 310, the virtual speaker set generation unit 320, the encoding analysis unit 330, the virtual speaker selection unit 340, and the virtual speaker signal generation unit 350. That is, the virtual speaker configuration unit 310, the virtual speaker set generation unit 320, the encoding analysis unit 330, the virtual speaker selection unit 340, and the virtual speaker signal generation unit 350 implement the functions of the spatial encoder 1131. The core encoder 1132 may include the encoding unit 360. That is, the encoding unit 360 implements the functions of the core encoder 1132.

The encoder shown in FIG. 3 may generate one virtual speaker signal, or may generate a plurality of virtual speaker signals. The plurality of virtual speaker signals may be obtained by the encoder shown in FIG. 3 through a plurality of executions, or may be obtained by the encoder shown in FIG. 3 through one execution.

Figure 4:
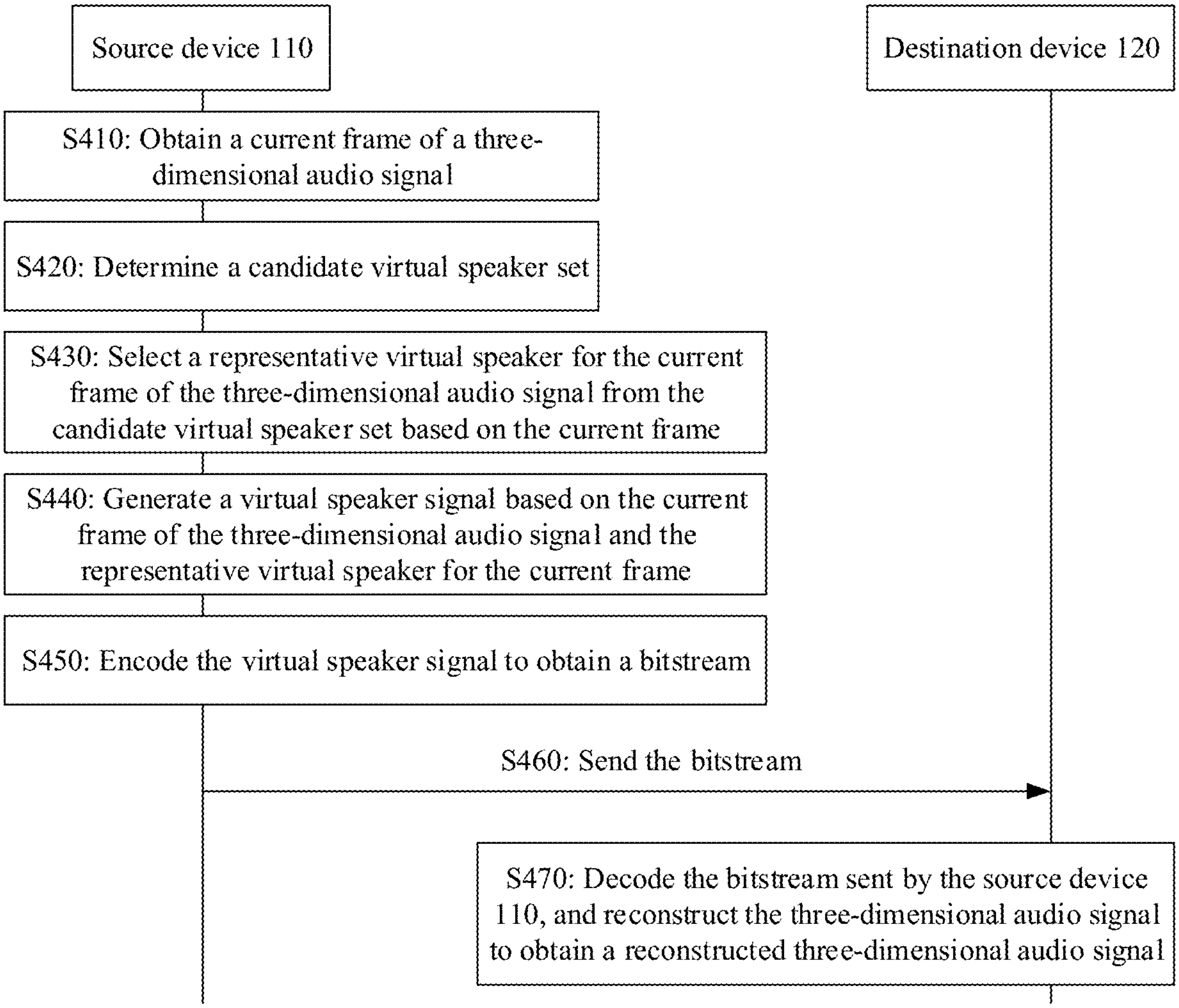
FIG. 4 is a schematic flowchart of a three-dimensional audio encoding method according to an embodiment of this application.

The following describes a coding process of a three-dimensional audio signal with reference to accompanying drawings. FIG. 4 is a schematic flowchart of a three-dimensional audio encoding method according to an embodiment of this application. Herein, a description is provided by using an example in which the source device 110 and the destination device 120 in FIG. 1 perform a three-dimensional audio signal coding process. As shown in FIG. 4, the method includes the following operations.

S410: The source device 110 obtains a current frame of a three-dimensional audio signal.

As described in the foregoing embodiments, if the source device 110 carries the audio obtaining device 111, the source device 110 may acquire original audio by using the audio obtaining device 111. Optionally, the source device 110 may alternatively receive original audio acquired by another device, or obtain original audio from a memory in the source device 110 or another memory. The original audio may include at least one of the following: real-world sound acquired in real time, audio stored on a device, and audio obtained through synthesis of a plurality of pieces of audio. A manner of obtaining the original audio and a type of the original audio are not limited in this embodiment.

After obtaining the original audio, the source device 110 generates the three-dimensional audio signal based on a three-dimensional audio technology and the original audio, to provide "immersive" sound effect for a listener during playback of the original audio. For a specific method for generating the three-dimensional audio signal, refer to the descriptions of the pre-processor 112 in the foregoing embodiments and descriptions of the conventional technology.

In addition, an audio signal is a continuous analog signal. During processing of the audio signal, the audio signal may be first sampled to generate a digital signal of a frame sequence. A frame may include a plurality of sampling points. The frame may alternatively be a sampling point obtained through sampling. The frame may alternatively include subframes obtained by dividing the frame. The frame may alternatively be a subframe obtained by dividing a frame. For example, if a length of a frame is L sampling points and the frame is divided into N subframes, each subframe corresponds to L/N sampling points. Audio encoding and decoding usually mean processing an audio frame sequence that includes a plurality of sampling points.

An audio frame may include a current frame or a previous frame. The current frame or the previous frame described in embodiments of this application may be a frame or a subframe. The current frame is a frame on which coding processing is performed at a current moment. The previous frame is a frame on which coding processing has been performed at a moment before the current moment. The previous frame may be a frame at one moment before the current moment or frames at a plurality of moments before the current moment. In this embodiment of this application, the current frame of the three-dimensional audio signal is a frame of three-dimensional audio signal on which coding processing is performed at a current moment, and a previous frame is a frame of three-dimensional audio signal on which coding processing has been performed at a moment before the current moment. The current frame of the three-dimensional audio signal may be a to-be-encoded current frame of the three-dimensional audio signal. The current frame of the three-dimensional audio signal may be referred to as a current frame for short. The previous frame of the three-dimensional audio signal may be referred to as a previous frame for short.

S420: The source device 110 determines a candidate virtual speaker set.

In a case, a candidate virtual speaker set is preconfigured in the memory of the source device 110. The source device 110 may read the candidate virtual speaker set from the memory. The candidate virtual speaker set includes a plurality of virtual speakers. The virtual speaker represents a virtual speaker in a spatial sound field. The virtual speaker is configured to calculate a virtual speaker signal based on the three-dimensional audio signal, so that the destination device 120 plays back a reconstructed three-dimensional audio signal.

In another case, a virtual speaker configuration parameter is preconfigured in the memory of the source device 110. The source device 110 generates the candidate virtual speaker set based on the virtual speaker configuration parameter. Optionally, the source device 110 generates the candidate virtual speaker set in real time based on a computing resource (for example, a processor) capability of the source device 110 and a feature (for example, a channel and a data volume) of the current frame.

For a specific method for generating the candidate virtual speaker set, refer to the conventional technology and the descriptions of the virtual speaker configuration unit 310 and the virtual speaker set generation unit 320 in the foregoing embodiments.

S430: The source device 110 selects a representative virtual speaker for the current frame of the three-dimensional audio signal from the candidate virtual speaker set based on the current frame.

The source device 110 votes for a virtual speaker based on a coefficient for the current frame and a coefficient for the virtual speaker, and selects the representative virtual speaker for the current frame from the candidate virtual speaker set based on a vote value of the virtual speaker. The candidate virtual speaker set is searched for a limited quantity of representative virtual speakers for the current frame as an optimal matching virtual speaker for the to-be-encoded current frame, to compress data of the to-be-encoded three-dimensional audio signal.

Figure 5A:
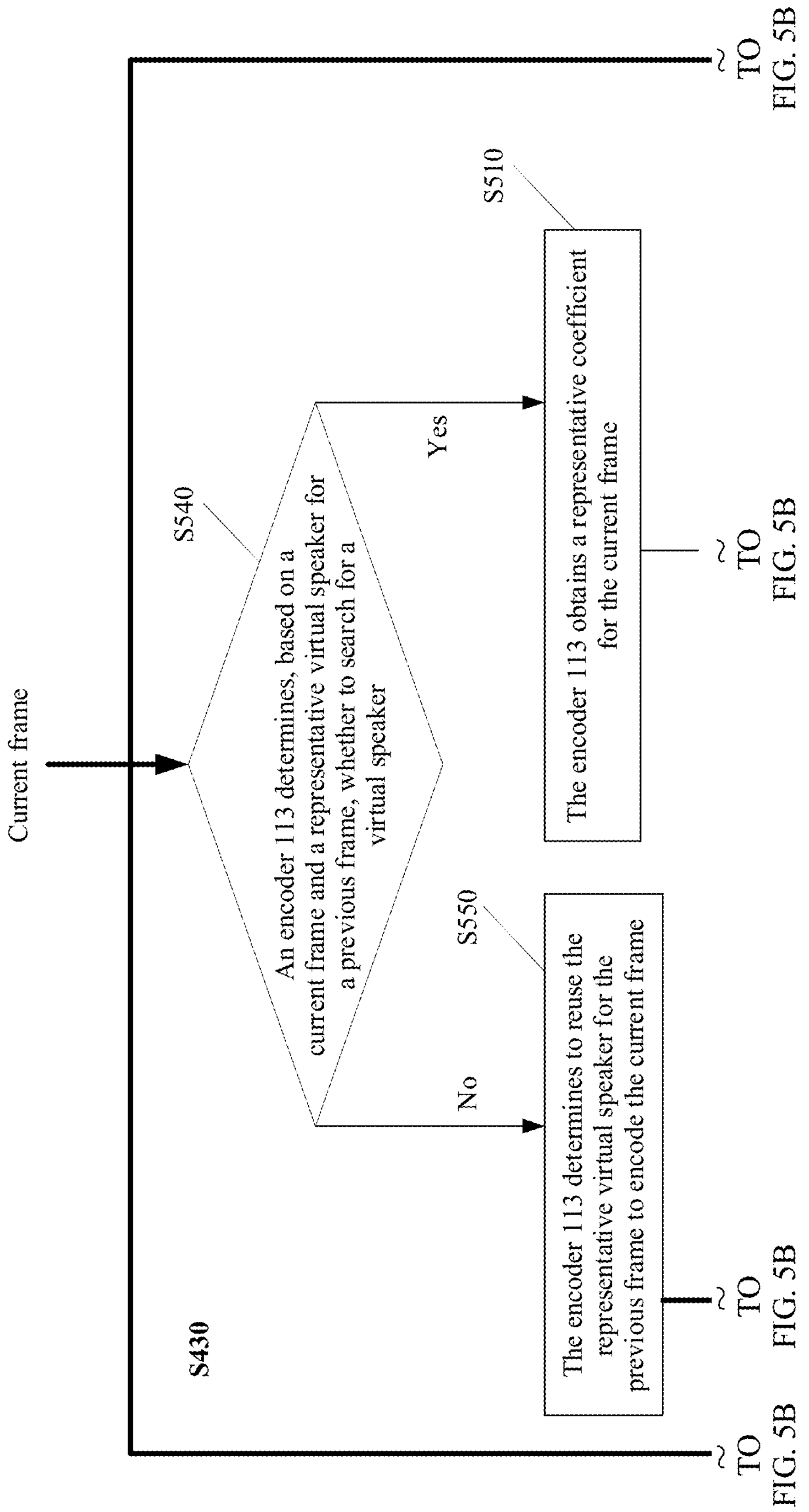
FIG. 5A and FIG. 5B are a schematic flowchart of a virtual speaker selection method according to an embodiment of this application.
Figure 5B:
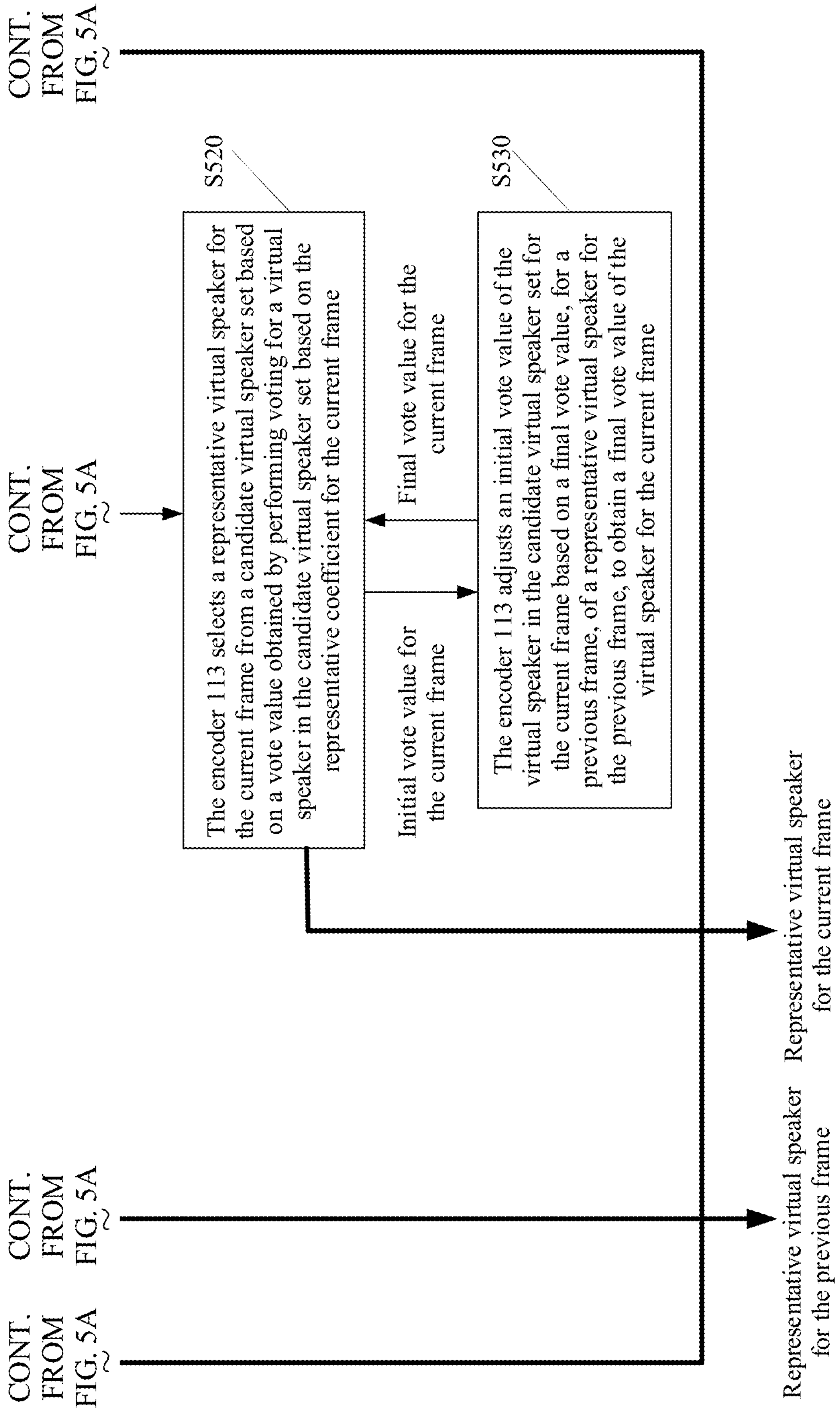

FIG. 5A and FIG. 5B are a schematic flowchart of a virtual speaker selection method according to an embodiment of this application. The method process shown in FIG. 5A and FIG. 5B is a description of a specific operation process included in S430 in FIG. 4. Herein, a description is provided by using an example in which the encoder 113 in the source device 110 shown in FIG. 1 performs a virtual speaker selection process. Specifically, a function of the virtual speaker selection unit 340 is implemented. As shown in FIG. 5A and FIG. 5B, the method includes the following operations.

S510: The encoder 113 obtains a representative coefficient for the current frame.

The representative coefficient may be a frequency domain representative coefficient or a time domain representative coefficient. The frequency domain representative coefficient may also be referred to as a frequency domain representative frequency or a spectral representative coefficient. The time domain representative coefficient may also be referred to as a time domain representative sampling point. For a specific method for obtaining the representative coefficient for the current frame, refer to the following descriptions of S610 and S620 in FIG. 6, FIG. 7A, and FIG. 7B.

S520: The encoder 113 selects a representative virtual speaker for the current frame from a candidate virtual speaker set based on a vote value obtained by performing voting for a virtual speaker in the candidate virtual speaker set based on the representative coefficient for the current frame, that is, performs S440 to S460.

The encoder 113 votes for a virtual speaker in the candidate virtual speaker set based on the representative coefficient for the current frame and a coefficient for the virtual speaker, and selects (searches for) a representative virtual speaker for the current frame from the candidate virtual speaker set based on a final vote value of the virtual speaker for the current frame. For a specific method for selecting a representative virtual speaker for the current frame, refer to the following descriptions of S630 in FIG. 8 and FIG. 9.

It should be noted that the encoder first traverses virtual speakers included in the candidate virtual speaker set, and compresses the current frame by using the representative virtual speaker for the current frame selected from the candidate virtual speaker set. However, if results of selecting virtual speakers for consecutive frames vary greatly, a sound image of a reconstructed three-dimensional audio signal is unstable, and sound quality of the reconstructed three-dimensional audio signal is degraded. In this embodiment of this application, the encoder 113 may update, based on a final vote value that is for a previous frame and that is of a representative virtual speaker for the previous frame, an initial vote value that is for the current frame and that is of a virtual speaker included in the candidate virtual speaker set, to obtain a final vote value of the virtual speaker for the current frame; and then select the representative virtual speaker for the current frame from the candidate virtual speaker set based on the final vote value of the virtual speaker for the current frame. In this way, the representative virtual speaker for the current frame is selected based on the representative virtual speaker for the previous frame. Therefore, when selecting, for the current frame, a representative virtual speaker for the current frame, the encoder more tends to select a virtual speaker that is the same as the representative virtual speaker for the previous frame. This improves orientation continuity between consecutive frames, and resolves the problem that results of selecting virtual speakers for consecutive frames vary greatly. Therefore, this embodiment of this application may further include operation S530.

S530: The encoder 113 adjusts the initial vote value of the virtual speaker in the candidate virtual speaker set for the current frame based on the final vote value, for the previous frame, of the representative virtual speaker for the previous frame, to obtain the final vote value of the virtual speaker for the current frame.

After voting for the virtual speaker in the candidate virtual speaker set based on the representative coefficient for the current frame and the coefficient for the virtual speaker to obtain the initial vote value of the virtual speaker for the current frame, the encoder 113 adjusts the initial vote value of the virtual speaker in the candidate virtual speaker set for the current frame based on the final vote value, for the previous frame, of the representative virtual speaker for the previous frame, to obtain the final vote value of the virtual speaker for the current frame. The representative virtual speaker for the previous frame is a virtual speaker used when the encoder 113 encodes the previous frame. For a specific method for adjusting the initial vote value of the virtual speaker in the candidate virtual speaker set for the current frame, refer to the following descriptions of S6302*a* and S6302*b* in FIG. 9.

In some embodiments, if the current frame is a first frame in the original audio, the encoder 113 performs S510 and S520. If the current frame is any frame after a second frame in the original audio, the encoder 113 may first determine whether to reuse the representative virtual speaker for the previous frame to encode the current frame; or determine whether to search for a virtual speaker, so as to ensure orientation continuity between consecutive frames and reduce encoding complexity. This embodiment of this application may further include S540.

S540: The encoder 113 determines, based on the current frame and the representative virtual speaker for the previous frame, whether to search for a virtual speaker.

If determining to search for a virtual speaker, the encoder 113 performs S510 to S530. Optionally, the encoder 113 may first perform S510: The encoder 113 obtains the representative coefficient for the current frame. The encoder 113 determines, based on the representative coefficient for the current frame and a coefficient for the representative virtual speaker for the previous frame, whether to search for a virtual speaker. If determining to search for a virtual speaker, the encoder 113 performs S520 and S530.

If determining not to search for a virtual speaker, the encoder 113 performs S550.

S550: The encoder 113 determines to reuse the representative virtual speaker for the previous frame to encode the current frame.

The encoder 113 reuses the representative virtual speaker for the previous frame and the current frame to generate a virtual speaker signal, encodes the virtual speaker signal to obtain a bitstream, and sends the bitstream to the destination device 120, that is, performs S450 and S460.

Figure 10:
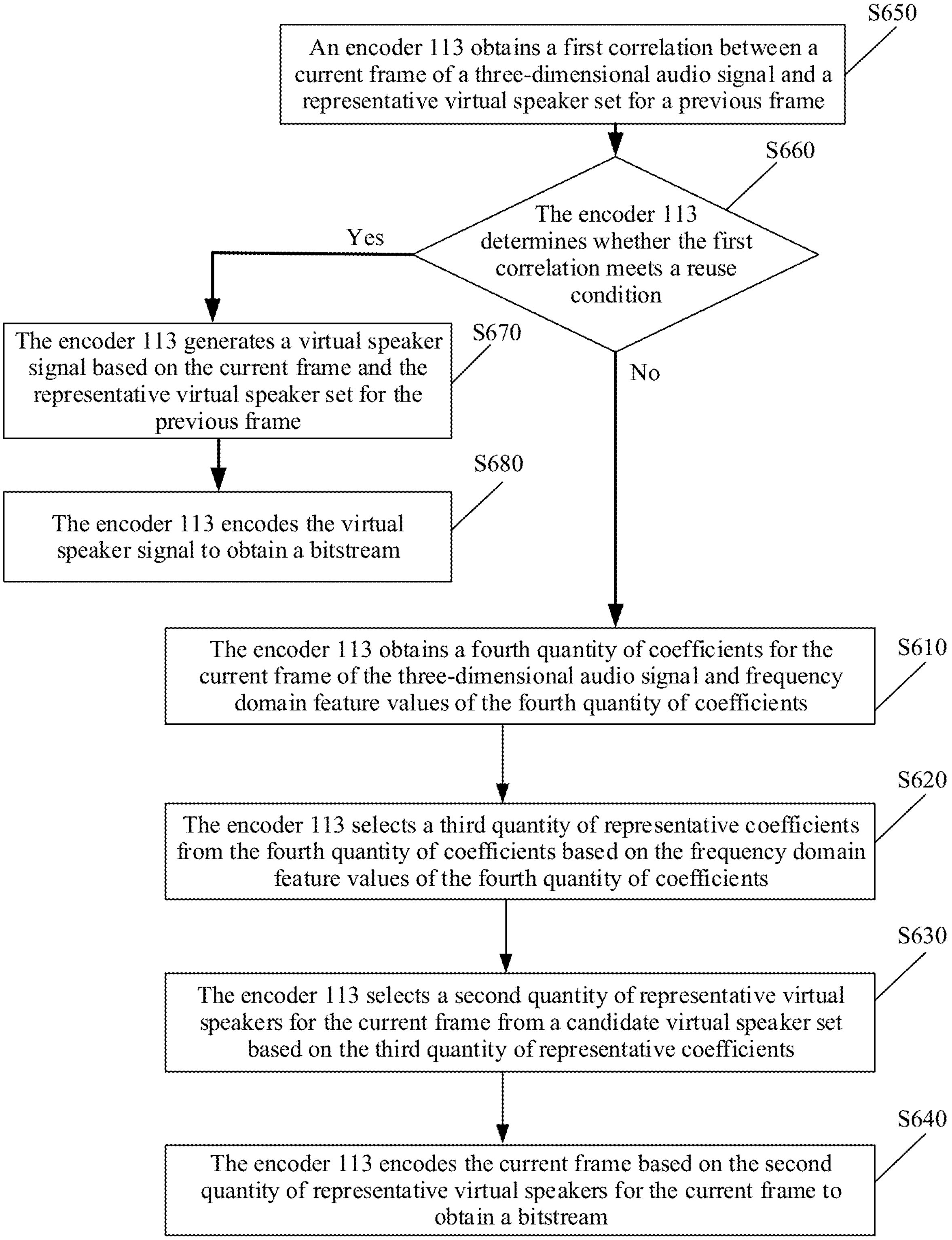
FIG. 10 is a schematic flowchart of another virtual speaker selection method according to an embodiment of this application.

For a specific method for determining whether to search for a virtual speaker, refer to the following descriptions of S650 and S660 in FIG. 10.

S440: The source device 110 generates a virtual speaker signal based on the current frame of the three-dimensional audio signal and the representative virtual speaker for the current frame.

The source device 110 generates the virtual speaker signal based on the coefficient for the current frame and a coefficient for the representative virtual speaker for the current frame. For a specific method for generating the virtual speaker signal, refer to the conventional technology and the descriptions of the virtual speaker signal generation unit 350 in the foregoing embodiments.

S450: The source device 110 encodes the virtual speaker signal to obtain a bitstream.

The source device 110 may perform an encoding operation such as transformation or quantization on the virtual speaker signal to generate the bitstream, so as to compress data of the to-be-encoded three-dimensional audio signal. For a specific method for generating the bitstream, refer to the conventional technology and the descriptions of the encoding unit 360 in the foregoing embodiments.

S460: The source device 110 sends the bitstream to the destination device 120.

The source device 110 may send a bitstream of the original audio to the destination device 120 after encoding all of the original audio. Alternatively, the source device 110 may encode the three-dimensional audio signal in unit of frames in real time, and send a bitstream of a frame after encoding the frame. For a specific method for sending the bitstream, refer to the conventional technology and the descriptions of the communication interface 114 and the communication interface 124 in the foregoing embodiments.

S470: The destination device 120 decodes the bitstream sent by the source device 110, and reconstructs the three-dimensional audio signal to obtain a reconstructed three-dimensional audio signal.

After receiving the bitstream, the destination device 120 decodes the bitstream to obtain the virtual speaker signal, and then reconstructs the three-dimensional audio signal based on the candidate virtual speaker set and the virtual speaker signal to obtain the reconstructed three-dimensional audio signal. The destination device 120 plays back the reconstructed three-dimensional audio signal. Alternatively, the destination device 120 transmits the reconstructed three-dimensional audio signal to another playing device, and the another playing device plays the reconstructed three-dimensional audio signal, to achieve more vivid "immersive" sound effect in which a listener feels like being in a cinema, a concert hall, a virtual scene, or the like.

Currently, in a process of searching for a virtual speaker, a correlation operation needs to be performed on each coefficient for the three-dimensional audio signal and a coefficient for each virtual speaker to measure a relationship between each virtual speaker in the candidate virtual speaker set and the three-dimensional audio signal. This imposes heavy calculation load on the encoder. An embodiment of this application provides a method for selecting a coefficient for a three-dimensional audio signal. An encoder performs a correlation operation on a representative coefficient for a three-dimensional audio signal and a coefficient for each virtual speaker to select a representative virtual speaker, so as to reduce complexity of calculation performed by the encoder to search for a virtual speaker.

Figure 6:
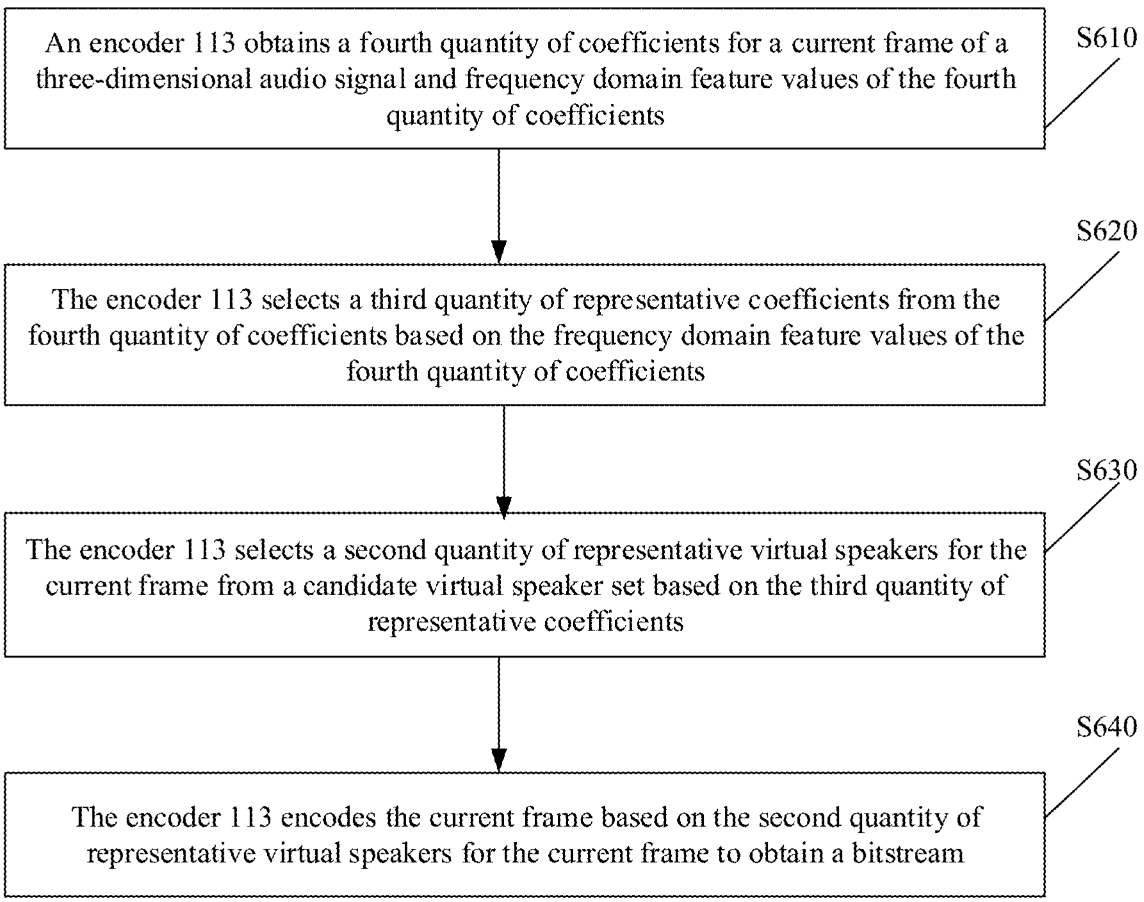
FIG. 6 is a schematic flowchart of a three-dimensional audio signal encoding method according to an embodiment of this application.

The method for selecting a coefficient for a three-dimensional audio signal is described below in detail with reference to accompanying drawings. FIG. 6 is a schematic flowchart of a three-dimensional audio signal encoding method according to an embodiment of this application. Herein, a description is provided by using an example in which the encoder 113 in the source device 110 in FIG. 1 performs a process of selecting a coefficient for a three-dimensional audio signal. Specifically, a function of the virtual speaker selection unit 340 is implemented. The method process shown in FIG. 6 is a description of a specific operation process included in S510 in FIG. 5A. As shown in FIG. 6, the method includes the following operations.

S610: The encoder 113 obtains a fourth quantity of coefficients for the current frame of the three-dimensional audio signal and frequency domain feature values of the fourth quantity of coefficients.

Assuming that the three-dimensional audio signal is an HOA signal, the encoder 113 may sample a current frame of the HOA signal to obtain $L\cdot(N+1)^2$ sampling points, that is, obtain a fourth quantity of coefficients. N indicates an order of the HOA signal. For example, assuming that duration of the current frame of the HOA signal is 20 milliseconds, the encoder 113 samples the current frame based on a frequency of 48 kHz, to obtain $960\cdot(N+1)^2$ sampling points in time domain. The sampling point may also be referred to as a time domain coefficient.

A frequency domain coefficient for the current frame of the three-dimensional audio signal may be obtained through time-frequency conversion based on a time domain coefficient for the current frame of the three-dimensional audio signal. A method for conversion from time domain to frequency domain is not limited. For example, the method for conversion from time domain to frequency domain is modified discrete cosine transform (MDCT). In this case, $960\cdot(N+1)^2$ frequency domain coefficients in frequency domain may be obtained. The frequency domain coefficient may also be referred to as a spectral coefficient or a frequency.

A frequency domain feature value of the sampling point satisfies the following formula: p(j)=norm(x(j)), where j=1, 2, . . . , and L, L indicates a quantity of sampling moments, x indicates the frequency domain coefficient, for example, an MDCT coefficient, for the current frame of the three-dimensional audio signal, norm is an operation of calculating a 2-norm, and x(j) indicates frequency domain coefficients for $(N+1)^2$ sampling points at a $j^{th}$ sampling moment.

The frequency domain feature value of the sampling point may alternatively be any channel coefficient in the HOA signal. Usually, a channel coefficient corresponding to a $0^{th}$-order is selected. Therefore, a frequency domain feature value of the HOA signal satisfies the following formula: $p(j)=x_0(j)$, where $x_0(j)$ indicates a frequency domain coefficient for a $j^{th}$ $0^{th}$-order frequency.

The frequency domain feature value of the sampling point may alternatively be an average value of a plurality of channel coefficients in the HOA signal. Therefore, the frequency domain feature value of the HOA signal satisfies the following formula: p(j)=mean(x(j)), where mean indicates an averaging operation.

S620: The encoder 113 selects a third quantity of representative coefficients from the fourth quantity of coefficients based on the frequency domain feature values of the fourth quantity of coefficients.

The encoder 113 divides a spectral range indicated by the fourth quantity of coefficients into at least one subband. The encoder 113 divides the spectral range indicated by the fourth quantity of coefficients into one subband. It can be understood that a spectral range of the subband is equal to the spectral range indicated by the fourth quantity of coefficients. This is equivalent to that the encoder 113 does not divide the spectral range indicated by the fourth quantity of coefficients.

If the encoder 113 divides the spectral range indicated by the fourth quantity of coefficients into at least two subbands, in one case, the encoder 113 equally divides the spectral range indicated by the fourth quantity of coefficients into at least two subbands, and the at least two subbands each include a same quantity of coefficients.

In another case, the encoder 113 unequally divides the spectral range indicated by the fourth quantity of coefficients, and at least two subbands obtained through division include different quantities of coefficients, or at least two subbands obtained through division each include a different quantity of coefficients. For example, the encoder 113 may unequally divide the spectral range indicated by the fourth quantity of coefficients based on a low frequency range, an intermediate frequency range, and a high frequency range in the spectral range indicated by the fourth quantity of coefficients, so that each spectral range of the low frequency range, the intermediate frequency range, and the high frequency range includes at least one subband. At least one subband in the low frequency range each includes a same quantity of coefficients. At least one subband in the intermediate frequency range each includes a same quantity of coefficients. At least one subband in the high frequency range each includes a same quantity of coefficients. Subbands in the three spectral ranges of the low frequency range, the intermediate frequency range, and the high frequency range may include different quantities of coefficients.

For example, the encoder 113 divides, based on a psychoacoustic model, the spectral range indicated by the fourth quantity of coefficients into T subbands. For example, T=44. A starting coefficient sequence number in an $i^{th}$ subband is denoted as sfb[i], where i=1, 2, . . . , and T, indicating that a value of i ranges from 1 to T. A quantity of coefficients included in the $i^{th}$ subband is denoted as b(i). Assuming that the low frequency range includes 10 subbands, b(1)=4 indicates that a first subband includes four coefficients, and b(10)=4 indicates that a $10^{th}$ subband includes four coefficients. The intermediate frequency range includes 20 subbands. b(11)=8 indicates that an $11^{th}$ subband includes eight coefficients, and b(30)=8 indicates that a $30^{th}$ subband includes eight coefficients. The high frequency range includes 14 subbands. b(31)=16 indicates that a thirty-first subband includes 16 coefficients, and b(44)=16 indicates that a $44^{th}$ subband includes 16 coefficients.

Further, the encoder 113 selects, based on the frequency domain feature values of the fourth quantity of coefficients, a representative coefficient from at least one subband included in the spectral range indicated by the fourth quantity of coefficients, to obtain the third quantity of representative coefficients. The third quantity is less than the fourth quantity, and the fourth quantity of coefficients include the third quantity of representative coefficients.

Figure 7A:
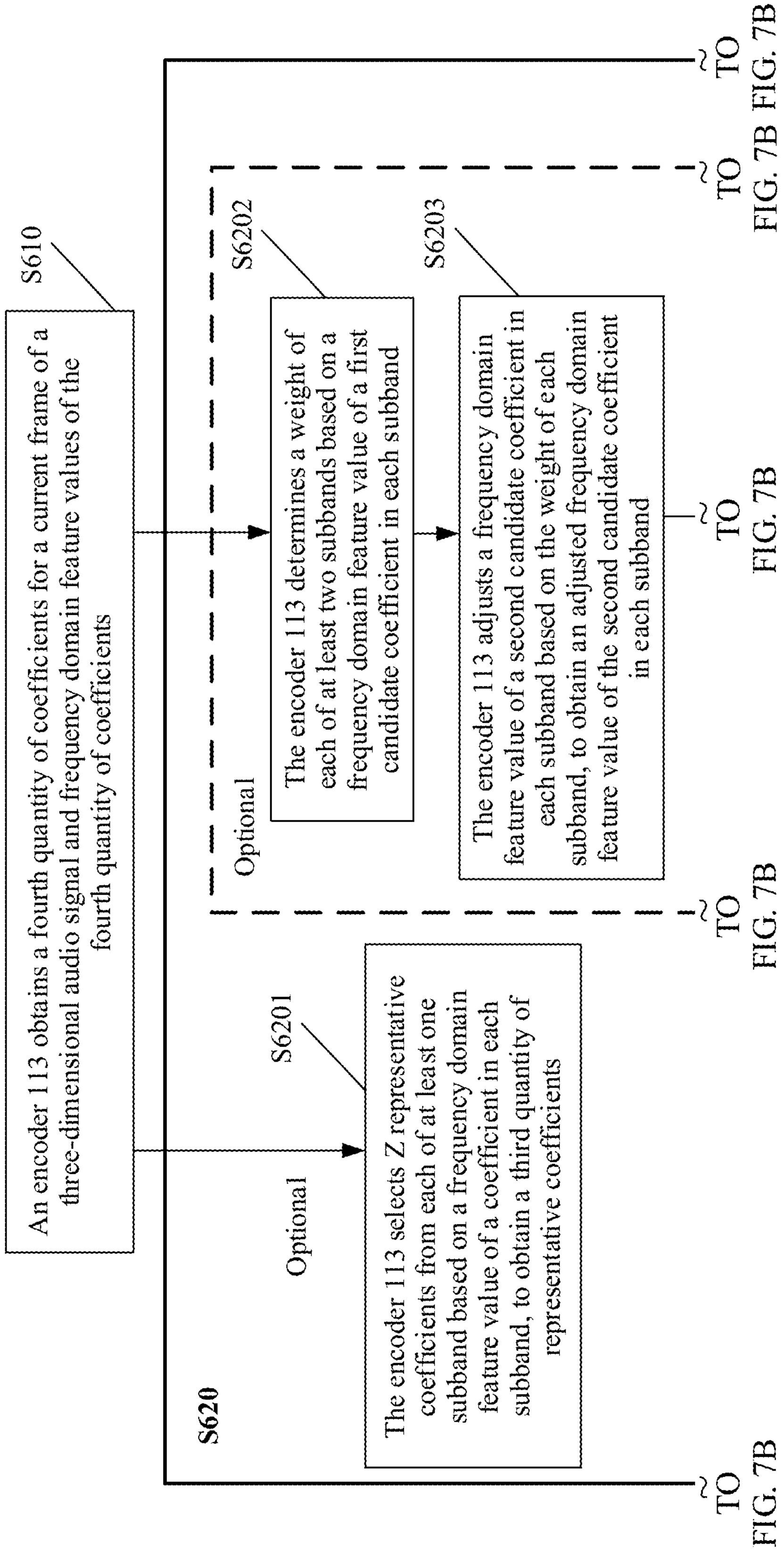
FIG. 7A and FIG. 7B are a schematic flowchart of a method for selecting a representative coefficient for a three-dimensional audio signal according to an embodiment of this application.
Figure 7B:
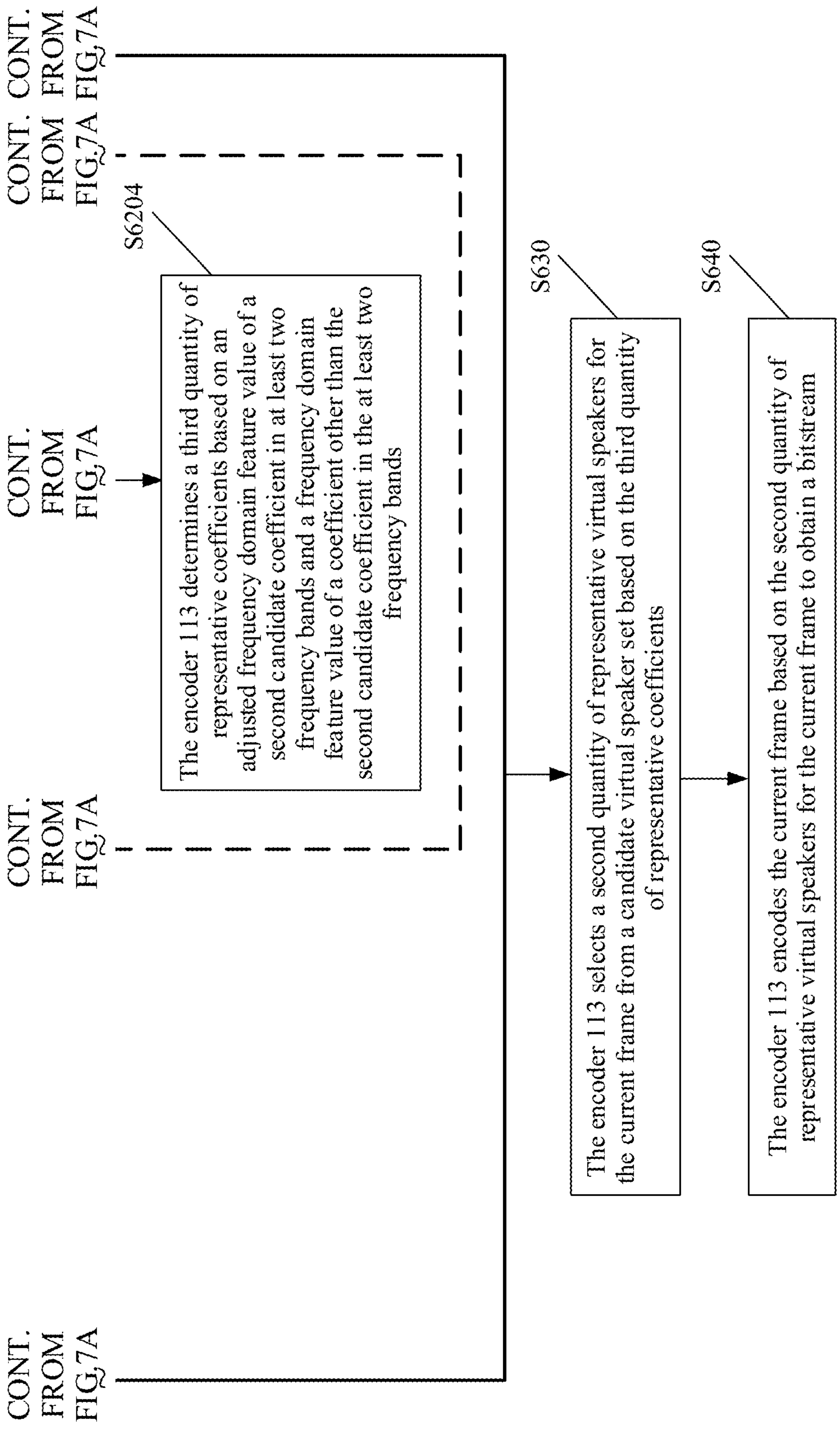

In a possible embodiment, a method process shown in FIG. 7A and FIG. 7B is a description of a specific operation process included in S620 in FIG. 6. As shown in FIG. 7A and FIG. 7B, the method includes the following operations.

S6201: The encoder 113 selects Z representative coefficients from each of the at least one subband based on a frequency domain feature value of a coefficient in each subband, to obtain the third quantity of representative coefficients, where Z is a positive integer.

For example, the encoder 113 selects Z representative coefficients from each of the at least one subband according to a descending order of frequency domain feature values of coefficients in each subband, and all representative coefficients selected from the at least one subband constitute the third quantity of representative coefficients.

For example, the encoder 113 sorts frequency domain feature values of b(i) coefficients in the $i^{th}$ subband in descending order, and starting from a coefficient with a largest frequency domain feature value in the $i^{th}$ subband, selects K(i) representative coefficients according to a descending order of the frequency domain feature values of the b(i) coefficients in the $i^{th}$ subband. Coefficient sequence numbers corresponding to K(i) representative coefficients in the $i^{th}$ subband are denoted as $a_i[j]$, where j=0, . . . , and K(i)−1, indicating that a value of j ranges from 0 to K(i)−1. A value of K(i) may be preset, or may be generated according to a predetermined rule. For example, starting from the coefficient with the largest frequency domain feature value in the $i^{th}$ subband, the encoder 113 selects 50% of coefficients with largest frequency domain feature values as representative coefficients.

In another possible embodiment, when the at least one subband includes at least two subbands, for each of the at least two subbands, the encoder 113 may first determine a weight of each of the at least two subbands, adjust a frequency domain feature value of a coefficient in each subband by using the weight of each subband, and then select the third quantity of representative coefficients from the at least two subbands. As shown in FIG. 7A and FIG. 7B, S620 may further include the following operations.

S6202: The encoder 113 determines a weight of each of the at least two subbands based on a frequency domain feature value of a first candidate coefficient in each subband.

The first candidate coefficient may be some coefficients in a subband. A quantity of first candidate coefficients is not limited in this embodiment of this application, and there may be one first candidate coefficient or at least two first candidate coefficients. In some embodiments, the encoder 113 may select the first candidate coefficient according to the method described in S6201. It can be understood that the encoder 113 selects Z representative coefficients from each of the at least two subbands according to a descending order of frequency domain feature values of coefficients in each subband, and uses the Z representative coefficients as a first candidate coefficient in each subband. For example, the at least two subbands include a first subband, and Z representative coefficients selected from the first subband are used as a first candidate coefficient in the first subband.

The encoder 113 determines a weight of the subband based on a frequency domain feature value of the first candidate coefficient in the subband and frequency domain feature values of all coefficients in the subband.

For example, the encoder 113 calculates a weight w(i) of an $i^{th}$ subband based on a frequency domain feature value of a candidate coefficient in the $i^{th}$ subband and frequency domain feature values of all coefficients in the $i^{th}$ subband. The weight w(i) of the $i^{th}$ subband satisfies formula (6):

$$W(i) = \sum_{j=0}^{K(i)-1} P(a_i[j]) \Big/ \sum_{j=0}^{b(i)-1} P(j + sfb[i]) \quad \text{Formula (6)}$$

p indicates a frequency domain feature value of a coefficient for the current frame, K(i) indicates a quantity of coefficients in the $i^{th}$ subband, $a_i$ [j] indicates a coefficient sequence number of a $j^{th}$ coefficient in the $i^{th}$ subband, sfb[i] indicates a starting coefficient sequence number in the $i^{th}$ subband, b(i) indicates a quantity of coefficients included in the $i^{th}$ subband, j=0, . . . , and K(i)−1, and i=1, 2, . . . , and T.

S6203: The encoder 113 adjusts a frequency domain feature value of a second candidate coefficient in each subband based on the weight of each subband, to obtain an adjusted frequency domain feature value of the second candidate coefficient in each subband.

The second candidate coefficient may be some coefficients in a subband. A quantity of second candidate coefficients is not limited in this embodiment of this application, and there may be one second candidate coefficient or at least two second candidate coefficients. In some embodiments, the encoder 113 may select the second candidate coefficient according to the method described in S6201. It can be understood that the encoder 113 selects Z representative coefficients from each of the at least two subbands according to a descending order of frequency domain feature values of coefficients in each subband, and uses the Z representative coefficients as a second candidate coefficient in each subband. In this case, the quantity of first candidate coefficients and the quantity of second candidate coefficients may be the same or different. For a first candidate coefficient and a second candidate coefficient in a subband, the first candidate coefficient and the second candidate coefficient may be a same coefficient or different coefficients. The encoder 113 may adjust frequency domain feature values of some coefficients in each subband.

The second candidate coefficient may alternatively be all coefficients in a subband. In this case, the quantity of first candidate coefficients and the quantity of second candidate coefficients may be different. It can be understood that the encoder 113 adjusts frequency domain feature values of all coefficients in each subband.

For example, the encoder 113 adjusts frequency domain feature values of K(i) coefficients in the $i^{th}$ subband based on the weight w(i) of the $i^{th}$ subband. Adjusted frequency domain feature values of the K(i) coefficients in the $i^{th}$ subband satisfy formula (7):

$$P'(a_i[j]) = P(a_i[j]) \cdot W(i) \quad \text{Formula (7)}$$

j=1, 2, . . . , and K(i). P($a_i$ [j]) indicates a frequency domain feature value corresponding to the $j^{th}$ coefficient in the $i^{th}$ subband, P'($a_i$ [j]) indicates an adjusted frequency domain feature value corresponding to the $j^{th}$ coefficient in the $i^{th}$ subband, K(i) indicates a quantity of coefficients in the $i^{th}$ subband, $a_i$ [j] indicates the coefficient sequence number of the $j^{th}$ coefficient in the $i^{th}$ subband, w(i) indicates the weight of the $i^{th}$ subband, j=0, . . . , and K(i)−1, and i=1, 2, . . . , and T.

S6204: The encoder 113 determines the third quantity of representative coefficients based on an adjusted frequency domain feature value of a second candidate coefficient in the at least two subbands and a frequency domain feature value of a coefficient other than the second candidate coefficient in the at least two subbands.

The encoder 113 sorts frequency domain feature values of all coefficients in the at least two subbands in descending order, and starting from a coefficient with a largest frequency domain feature value in the at least two subbands, selects the third quantity of representative coefficients according to the descending order of the frequency domain feature values of all the coefficients in the at least two subbands.

It can be understood that, if the second candidate coefficient is some coefficients in a subband, the frequency domain feature values of all the coefficients in the at least two subbands include the adjusted frequency domain feature value of the second candidate coefficient and the frequency domain feature value of the coefficient other than the second candidate coefficient in the at least two subbands. The encoder 113 determines the third quantity of representative coefficients based on the adjusted frequency domain feature value of the second candidate coefficient in the at least two subbands and the frequency domain feature value of the coefficient other than the second candidate coefficient in the at least two subbands.

If the second candidate coefficient is all coefficients in a subband, the frequency domain feature values of all the coefficients in the at least two subbands are the adjusted frequency domain feature value of the second candidate coefficient. The encoder 113 determines the third quantity of representative coefficients based on the adjusted frequency domain feature value of the second candidate coefficient in the at least two subbands.

The third quantity may be preset, or may be generated according to a preset rule. For example, the encoder 113 selects 20% of coefficients with largest frequency domain feature values from all the coefficients in at least two subbands as representative frequencies.

S630: The encoder 113 selects a second quantity of representative virtual speakers for the current frame from a candidate virtual speaker set based on the third quantity of representative coefficients.

The encoder 113 performs a correlation operation on the third quantity of representative coefficients for the current frame of the three-dimensional audio signal and a coefficient for each virtual speaker in the candidate virtual speaker set, and selects the second quantity of representative virtual speakers for the current frame.

The encoder selects some coefficients from all coefficients for the current frame as representative coefficients, and selects the representative virtual speakers from the candidate virtual speaker set by using a small quantity of representative coefficients to represent all the coefficients for the current frame. This effectively reduces complexity of calculation performed by the encoder to search for a virtual speaker, and therefore reduces calculation complexity of performing compression coding on the three-dimensional audio signal, and reduces calculation load of the encoder. For example, a frame of $N^{th}$-order HOA signal has 960 $(N+1)^2$ coefficients. In this embodiment, first 10% of coefficients may be selected to participate in a virtual speaker search. In this case, encoding complexity is reduced by 90% compared with encoding complexity in a case in which all coefficients participate in a virtual speaker search.

S640: The encoder 113 encodes the current frame based on the second quantity of representative virtual speakers for the current frame to obtain a bitstream.

The encoder 113 generates a virtual speaker signal based on the current frame and the second quantity of representative virtual speakers for the current frame, and encodes the virtual speaker signal to obtain the bitstream. For a specific method for generating the bitstream, refer to the conventional technology and the descriptions of the encoding unit 360 and S450 in the foregoing embodiments.

After generating the bitstream, the encoder 113 sends the bitstream to the destination device 120, so that the destination device 120 decodes the bitstream sent by the source device 110, and reconstructs the three-dimensional audio signal to obtain a reconstructed three-dimensional audio signal.

Because a frequency domain feature value of a coefficient for the current frame represents a sound field characteristic of the three-dimensional audio signal, the encoder selects, based on the frequency domain feature value of the coefficient for the current frame, a representative coefficient for the current frame that has a representative sound field component. A representative virtual speaker for the current frame selected from the candidate virtual speaker set by using the representative coefficient can fully represent the sound field characteristic of the three-dimensional audio signal. This further improves accuracy of generating, by the encoder, the virtual speaker signal by performing compression coding on the to-be-encoded three-dimensional audio signal by using the representative virtual speaker for the current frame, and helps increase a compression ratio for performing compression coding on the three-dimensional audio signal, and reduce bandwidth occupied by the encoder for transmitting the bitstream.

Figure 8:
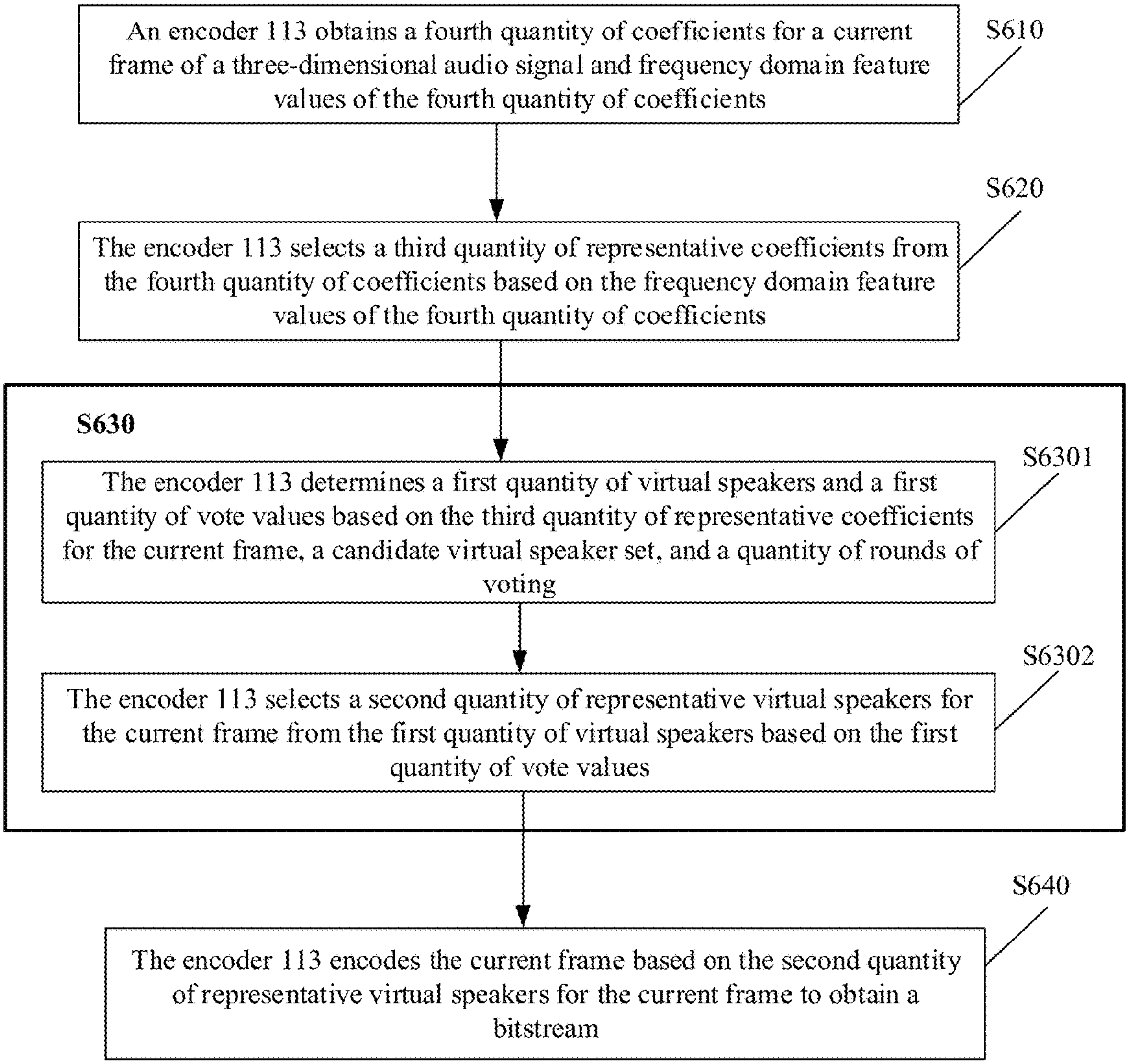
FIG. 8 is a schematic flowchart of a virtual speaker selection method according to an embodiment of this application.

In an embodiment of this application, the encoder 113 may select the second quantity of representative virtual speakers for the current frame based on a vote value obtained by voting for a virtual speaker in the candidate virtual speaker set based on the third quantity of representative coefficients for the current frame. The method process shown in FIG. 8 is a description of a specific operation process included in S630 in FIG. 7B. As shown in FIG. 8, the method includes the following operations.

S6301: The encoder 113 determines a first quantity of virtual speakers and a first quantity of vote values based on the third quantity of representative coefficients for the current frame, the candidate virtual speaker set, and a quantity of rounds of voting.

The quantity of rounds of voting is used to limit a quantity of times of voting performed for a virtual speaker. The quantity of rounds of voting is an integer greater than or equal to 1, the quantity of rounds of voting is less than or equal to a quantity of virtual speakers included in the candidate virtual speaker set, and the quantity of rounds of voting is less than or equal to a quantity of virtual speaker signals transmitted by the encoder. For example, the candidate virtual speaker set includes a fifth quantity of virtual speakers, the fifth quantity of virtual speakers include the first quantity of virtual speakers, the first quantity is less than or equal to the fifth quantity, the quantity of rounds of voting is an integer greater than or equal to 1, and the quantity of rounds of voting is less than or equal to the fifth quantity. The virtual speaker signal is also a transmission channel, corresponding to the current frame, for the representative virtual speaker for the current frame. Usually, the quantity of virtual speaker signals is less than or equal to the quantity of virtual speakers.

In a possible embodiment, the quantity of rounds of voting may be preconfigured, or may be determined based on a computing capability of the encoder. For example, the quantity of rounds of voting is determined based on an encoding rate and/or an encoding application scenario of the encoder.

In another possible embodiment, the quantity of rounds of voting is determined based on a quantity of directional sound sources in the current frame. For example, when a quantity of directional sound sources in a sound field is 2, the quantity of rounds of voting is set to 2.

This embodiment of this application provides three possible embodiments of determining the first quantity of virtual speakers and the first quantity of vote values. The following separately describes the three manners in detail.

In a first possible embodiment, the quantity of rounds of voting is equal to 1. After obtaining a plurality of representative coefficients through sampling, the encoder 113 obtains vote values obtained by voting for all virtual speakers in the candidate virtual speaker set based on each representative coefficient for the current frame, and accumulates vote values of virtual speakers with a same number to obtain the first quantity of virtual speakers and the first quantity of vote values. It can be understood that the candidate virtual speaker set includes the first quantity of virtual speakers. The first quantity is equal to the quantity of virtual speakers included in the candidate virtual speaker set. Assuming that the candidate virtual speaker set includes the fifth quantity of virtual speakers, the first quantity is equal to the fifth quantity. The first quantity of vote values include the vote values of all the virtual speakers in the candidate virtual speaker set. The encoder 113 may use the first quantity of vote values as final vote values of the first quantity of virtual speakers for the current frame, and perform S6302: The encoder 113 selects the second quantity of representative virtual speakers for the current frame from the first quantity of virtual speakers based on the first quantity of vote values.

The virtual speakers are in a one-to-one correspondence with the vote values, that is, one virtual speaker corresponds to one vote value. For example, the first quantity of virtual speakers include a first virtual speaker, the first quantity of vote values include a vote value of the first virtual speaker, and the first virtual speaker corresponds to the vote value of the first virtual speaker. The vote value of the first virtual speaker represents a priority of the first virtual speaker. The priority may alternatively be replaced with a preference. To be specific, the vote value of the first virtual speaker represents a preference of using the first virtual speaker to encode the current frame. It can be understood that a larger vote value of the first virtual speaker indicates a higher priority or a higher preference of the first virtual speaker, and indicates that the encoder 113 more tends to select the first virtual speaker to encode the current frame, compared with a virtual speaker whose vote value is less than the vote value of the first virtual speaker in the candidate virtual speaker set.

In a second possible embodiment, a difference from the first possible embodiment lies in that, after obtaining vote values obtained by voting for all virtual speakers in the candidate virtual speaker set based on each representative coefficient for the current frame, the encoder 113 selects some vote values from the vote values obtained by voting for all the virtual speakers in the candidate virtual speaker set based on each representative coefficient, and accumulates vote values of virtual speakers with a same number among virtual speakers corresponding to the these vote values, to obtain the first quantity of virtual speakers and the first quantity of vote values. It can be understood that the candidate virtual speaker set includes the first quantity of virtual speakers. The first quantity is less than or equal to the quantity of virtual speakers included in the candidate virtual speaker set. The first quantity of vote values include vote values of some virtual speakers included in the candidate virtual speaker set, or the first quantity of vote values include vote values of all the virtual speakers included in the candidate virtual speaker set.

In a third possible embodiment, a difference from the second possible embodiment lies in that the quantity of rounds of voting is an integer greater than or equal to 2. For each representative coefficient for the current frame, the encoder 113 performs at least two rounds of voting on all virtual speakers in the candidate virtual speaker set, and selects a virtual speaker with a largest vote value in each round. After performing at least two rounds of voting on all the virtual speakers for each representative coefficient for the current frame, the encoder 113 accumulates vote values of virtual speakers with a same number to obtain the first quantity of virtual speakers and the first quantity of vote values.

S6302: The encoder 113 selects the second quantity of representative virtual speakers for the current frame from the first quantity of virtual speakers based on the first quantity of vote values.

The encoder 113 selects the second quantity of representative virtual speakers for the current frame from the first quantity of virtual speakers based on the first quantity of vote values, and vote values of the second quantity of representative virtual speakers for the current frame are greater than a preset threshold.

Alternatively, the encoder 113 may select the second quantity of representative virtual speakers for the current frame from the first quantity of virtual speakers based on the first quantity of vote values. For example, the encoder 113 determines a second quantity of vote values from the first quantity of vote values according to a descending order of the first quantity of vote values, and uses, as the second quantity of representative virtual speakers for the current frame, virtual speakers corresponding to the second quantity of vote values among the first quantity of virtual speakers.

In an embodiment, if vote values of virtual speakers with different numbers among the first quantity of virtual speakers are the same, and the vote values of the virtual speakers with different numbers are greater than a preset threshold, the encoder 113 may use all the virtual speakers with different numbers as representative virtual speakers for the current frame.

It should be noted that the second quantity is less than the first quantity. The first quantity of virtual speakers include the second quantity of representative virtual speakers for the current frame. The second quantity may be preset, or the second quantity may be determined based on a quantity of sound sources in a sound field of the current frame. For example, the second quantity may be directly equal to the quantity of sound sources in the sound field of the current frame; or the quantity of sound sources in the sound field of the current frame is processed based on a preset algorithm, and a quantity obtained through processing is used as the second quantity. The preset algorithm may be designed according to a requirement. For example, the preset algorithm may be as follows: the second quantity=the quantity of sound sources in the sound field of the current frame+1; or the second quantity=the quantity of sound sources in the sound field of the current frame−1.

The encoder votes for each virtual speaker in the candidate virtual speaker set by using a small quantity of representative coefficients to represent all coefficients for the current frame, and selects a representative virtual speaker for the current frame based on a vote value. Further, the encoder compresses and encodes the to-be-coded three-dimensional audio signal by using the representative virtual speaker for the current frame. This not only effectively increases a compression ratio for performing compression coding on the three-dimensional audio signal, but also reduces complexity of calculation performed by the encoder to search for a virtual speaker, and therefore reduces calculation complexity of performing compression coding on the three-dimensional audio signal, and reduces calculation load of the encoder.

Figure 9:
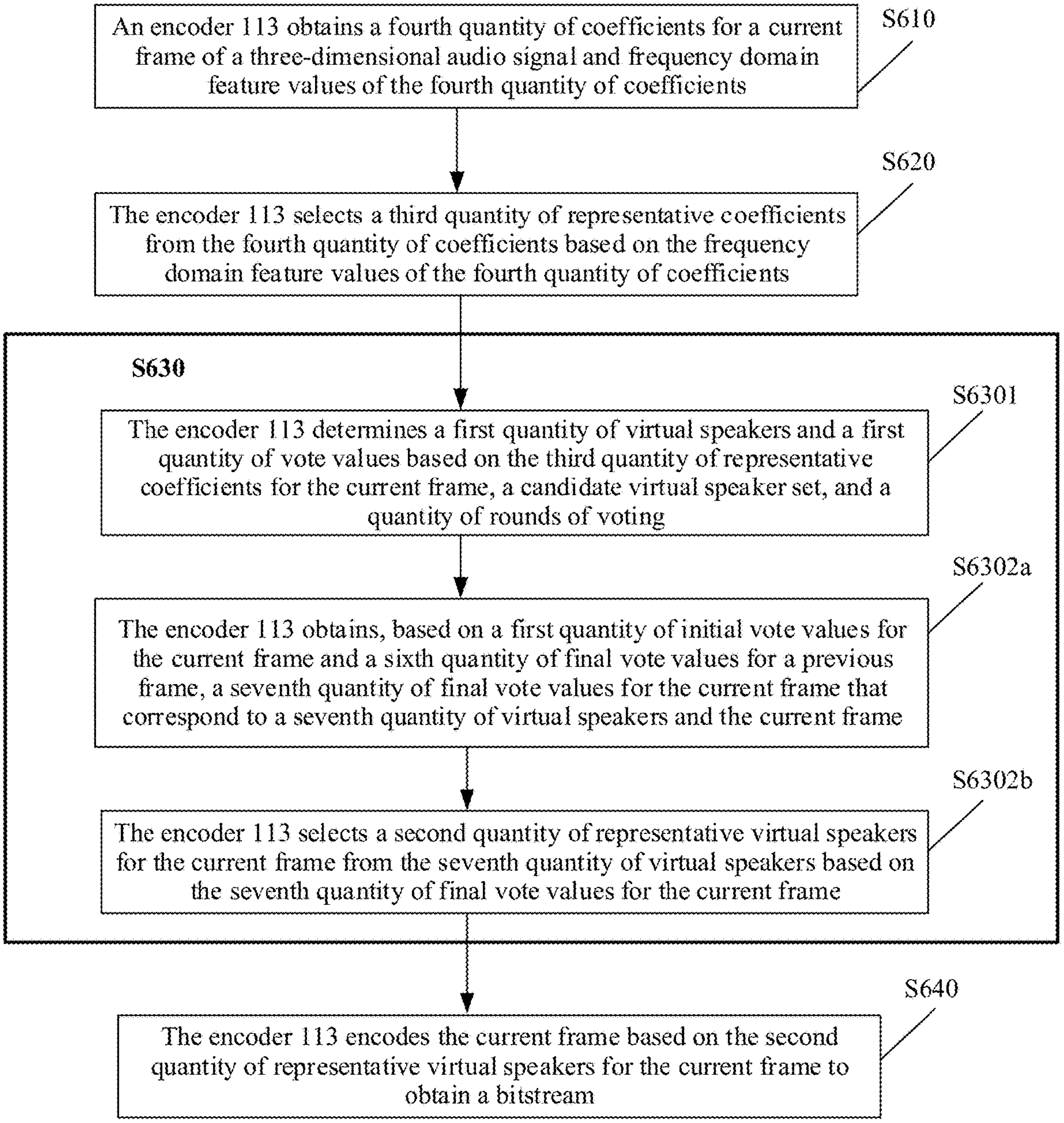
FIG. 9 is a schematic flowchart of another virtual speaker selection method according to an embodiment of this application.

To improve orientation continuity between consecutive frames and resolve the problem that results of selecting virtual speakers for consecutive frames vary greatly, the encoder 113 adjusts the initial vote value of the virtual speaker in the candidate virtual speaker set for the current frame based on the final vote value, for the previous frame, of the representative virtual speaker for the previous frame, to obtain the final vote value of the virtual speaker for the current frame. FIG. 9 is a schematic flowchart of another virtual speaker selection method according to an embodiment of this application. The method process shown in FIG. 9 is a description of a specific operation process included in S6302 in FIG. 8.

S6302*a*: The encoder 113 obtains, based on a first quantity of initial vote values for the current frame and a sixth quantity of final vote values for the previous frame, a seventh quantity of final vote values for the current frame that correspond to a seventh quantity of virtual speakers and the current frame.

The encoder 113 may determine the first quantity of virtual speakers and the first quantity of vote values based on the current frame of the three-dimensional audio signal, the candidate virtual speaker set, and the quantity of rounds of voting according to the method described in S6301, and then use the first quantity of vote values as initial vote values of the first quantity of virtual speakers for the current frame.

The virtual speakers are in a one-to-one correspondence with the initial vote values for the current frame, that is, one virtual speaker corresponds to one initial vote value for the current frame. For example, the first quantity of virtual speakers include a first virtual speaker, the first quantity of initial vote values for the current frame include an initial vote value of the first virtual speaker for the current frame, and the first virtual speaker corresponds to the initial vote value of the first virtual speaker for the current frame. The initial vote value of the first virtual speaker for the current frame represents a priority of using the first virtual speaker to encode the current frame.

A sixth quantity of virtual speakers included in a representative virtual speaker set for the previous frame are in a one-to-one correspondence with the sixth quantity of final vote values for the previous frame. The sixth quantity of virtual speakers may be representative virtual speakers for the previous frame of the three-dimensional audio signal that are used when the encoder 113 encodes the previous frame.

In an embodiment, the encoder 113 updates the first quantity of initial vote values for the current frame based on the sixth quantity of final vote values for the previous frame. To be specific, the encoder 113 calculates a sum of an initial vote value, for the current frame, of a virtual speaker in the first quantity of virtual speakers and a final vote value, for the previous frame, of a virtual speaker with a same number in the sixth quantity of virtual speakers, to obtain the seventh quantity of final vote values for the current frame that correspond to the seventh quantity of virtual speakers and the current frame. The seventh quantity of virtual speakers include the first quantity of virtual speakers, and the seventh quantity of virtual speakers include the sixth quantity of virtual speakers.

**S6302*b*: The encoder 113** selects the second quantity of representative virtual speakers for the current frame from the seventh quantity of virtual speakers based on the seventh quantity of final vote values for the current frame.

The encoder 113 selects the second quantity of representative virtual speakers for the current frame from the seventh quantity of virtual speakers based on the seventh quantity of final vote values for the current frame, and final vote values, for the current frame, of the second quantity of representative virtual speakers for the current frame are greater than a preset threshold.

Alternatively, the encoder 113 may select the second quantity of representative virtual speakers for the current frame from the seventh quantity of virtual speakers based on the seventh quantity of final vote values for the current frame. For example, the encoder 113 determines a second quantity of final vote values for the current frame from the seventh quantity of final vote values for the current frame according to a descending order of the seventh quantity of final vote values for the current frame, and uses, as the second quantity of representative virtual speaker for the current frame, virtual speakers that are in the seventh quantity of virtual speakers and that are associated with the second quantity of final vote values for the current frame.

In an embodiment, if vote values of virtual speakers with different numbers among the seventh quantity of virtual speakers are the same, and the vote values of the virtual speakers with different numbers are greater than a preset threshold, the encoder 113 may use all the virtual speakers with different numbers as representative virtual speakers for the current frame.

It should be noted that the second quantity is less than the seventh quantity. The seventh quantity of virtual speakers include the second quantity of representative virtual speakers for the current frame. The second quantity may be preset, or the second quantity may be determined based on the quantity of sound sources in the sound field of the current frame.

In addition, before the encoder 113 encodes a next frame of the current frame, if the encoder 113 determines to reuse a representative virtual speaker for a previous frame to encode the next frame, the encoder 113 may use the second quantity of representative virtual speakers for the current frame as a second quantity of representative virtual speakers for the previous frame, and encode the next frame of the current frame by using the second quantity of representative virtual speakers for the previous frame.

During searching for a virtual speaker, because a location of a real sound source does not necessarily coincide with a location of a virtual speaker, a virtual speaker and a real sound source are not necessarily able to form a one-to-one correspondence. In addition, in an actual complex scenario, a virtual speaker may not be able to represent an independent sound source in a sound field. In this case, virtual speakers found in different frames may frequently change, and this frequent change significantly affects auditory experience of a listener, and causes significant discontinuity and noise in a decoded and reconstructed three-dimensional audio signal. In the virtual speaker selection method provided in this embodiment of this application, a representative virtual speaker for a previous frame is inherited. To be specific, for virtual speakers with a same number, an initial vote value for the current frame is adjusted by using a final vote value for the previous frame, so that the encoder more tends to select a representative virtual speaker for the previous frame. This alleviates frequent changes of virtual speakers in different frames, enhances orientation continuity between frames, improves stability of a sound image of a reconstructed three-dimensional audio signal, and ensures sound quality of the reconstructed three-dimensional audio signal. In addition, a parameter is adjusted to ensure that the final vote value for the previous frame is not inherited for a long time. This avoids a case that an algorithm cannot adapt to a scenario in which a sound field changes, for example, a sound source moves.

In addition, an embodiment of this application further provides a virtual speaker selection method. An encoder may first determine whether to reuse a representative virtual speaker set for a previous frame to encode a current frame. If the encoder reuses the representative virtual speaker set for the previous frame to encode the current frame, the encoder does not need to perform a virtual speaker search process again. This effectively reduces complexity of calculation performed by the encoder to search for a virtual speaker, and therefore reduces calculation complexity of performing compression coding on a three-dimensional audio signal, and reduces calculation load of the encoder. If the encoder cannot reuse the representative virtual speaker set for the previous frame to encode the current frame, the encoder reselects a representative coefficient, votes for each virtual speaker in a candidate virtual speaker set by using a representative coefficient for the current frame, and selects a representative virtual speaker for the current frame based on a vote value, to reduce calculation complexity of performing compression coding on the three-dimensional audio signal, and reduce calculation load of the encoder. FIG. 10 is a schematic flowchart of a virtual speaker selection method according to an embodiment of this application. Before the encoder 113 obtains the fourth quantity of coefficients for the current frame of the three-dimensional audio signal and the frequency domain feature values of the fourth quantity of coefficients, that is, before S610, as shown in FIG. 10, the method includes the following operations.

S650: The encoder 113 obtains a first correlation between the current frame of the three-dimensional audio signal and the representative virtual speaker set for the previous frame.

The representative virtual speaker set for the previous frame includes the sixth quantity of virtual speakers. Virtual speakers included in the sixth quantity of virtual speakers are representative virtual speakers for the previous frame of the three-dimensional audio signal that are used to encode the previous frame. The first correlation represents a priority of reusing the representative virtual speaker set for the previous frame when the current frame is encoded. The priority may alternatively be replaced with a preference. To be specific, the first correlation is used to determine whether to reuse the representative virtual speaker set for the previous frame when the current frame is encoded. It can be understood that a higher first correlation with the representative virtual speaker set for the previous frame indicates a higher preference for the representative virtual speaker set for the previous frame, and indicates that the encoder 113 more tends to select a representative virtual speaker for the previous frame to encode the current frame.

S660: The encoder 113 determines whether the first correlation satisfies a reuse condition.

If the first correlation does not satisfy the reuse condition, it indicates that the encoder 113 more tends to search for a virtual speaker and encode the current frame based on a representative virtual speaker for the current frame, and S610 is performed: The encoder 113 obtains a fourth quantity of coefficients for the current frame of the three-dimensional audio signal and frequency domain feature values of the fourth quantity of coefficients.

In an embodiment, after selecting the third quantity of representative coefficients from the fourth quantity of coefficients based on the frequency domain feature values of the fourth quantity of coefficients, the encoder 113 may alternatively use a largest representative coefficient of the third quantity of representative coefficients as a coefficient for the current frame for obtaining a first correlation. In this case, the encoder 113 obtains a first correlation between the largest representative coefficient of the third quantity of representative coefficients for the current frame and the representative virtual speaker set for the previous frame. If the first correlation does not satisfy the reuse condition, S630 is performed: The encoder 113 selects a second quantity of representative virtual speakers for the current frame from a candidate virtual speaker set based on the third quantity of representative coefficients.

If the first correlation satisfies the reuse condition, it indicates that the encoder 113 more tends to select a representative virtual speaker for the previous frame to encode the current frame, and the encoder 113 performs S670 and S680.

S670: The encoder 113 generates a virtual speaker signal based on the current frame and the representative virtual speaker set for the previous frame.

S680: The encoder 113 encodes the virtual speaker signal to obtain a bitstream.

In the virtual speaker selection method provided in this embodiment of this application, whether to search for a virtual speaker is determined based on a correlation between a representative coefficient for the current frame and a representative virtual speaker for the previous frame. This effectively reduces complexity on the encoder side while ensuring accuracy of selecting a representative virtual speaker for the current frame based on a correlation.

It can be understood that, to implement the functions in the foregoing embodiments, the encoder includes corresponding hardware structures and/or software modules for performing the functions. A person skilled in the art should be easily aware that this application can be implemented by hardware or a combination of hardware and computer software in combination with the units and the method operations in the examples described in embodiments disclosed in this application. Whether a function is performed by hardware or hardware driven by computer software depends on particular application scenarios and design constraints of technical solutions.

The three-dimensional audio signal coding method provided in embodiments is described above in detail with reference to FIG. 1 to FIG. 10. A three-dimensional audio signal encoding apparatus and an encoder provided in embodiments are described below with reference to FIG. 11 and FIG. 12.

Figure 11:
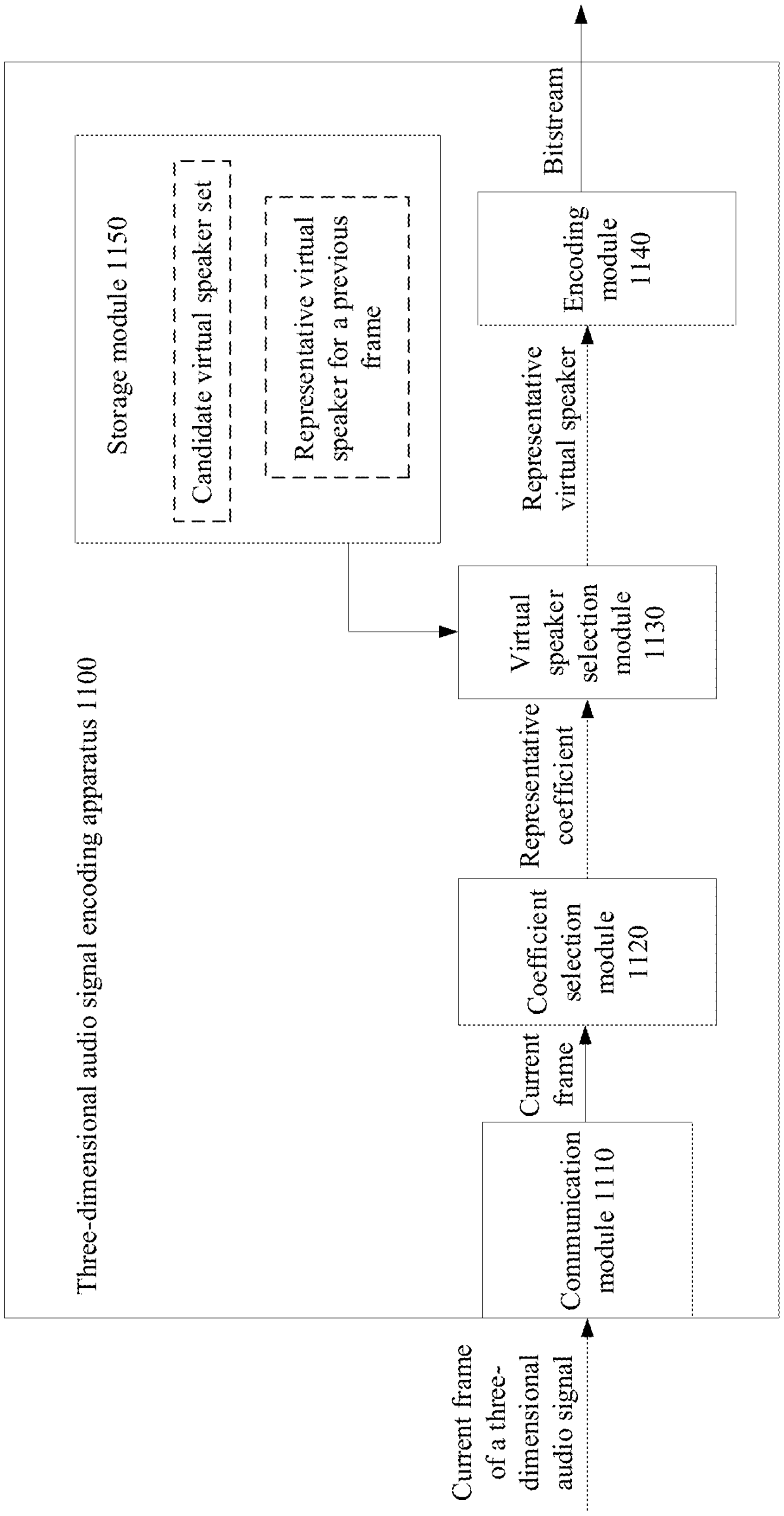
FIG. 11 is a schematic diagram of a structure of a three-dimensional audio signal encoding apparatus according to this application.

FIG. 11 is a schematic diagram of a structure of a possible three-dimensional audio signal encoding apparatus according to an embodiment. The three-dimensional audio signal encoding apparatus may be configured to implement the function of encoding a three-dimensional audio signal in the method embodiments, and therefore can also achieve the beneficial effect of the method embodiments. In this embodiment, the three-dimensional audio signal encoding apparatus may be the encoder 113 shown in FIG. 1, the encoder 300 shown in FIG. 3, or a module (for example, a chip) applied to a terminal device or a server.

As shown in FIG. 11, the three-dimensional audio signal encoding apparatus 1100 includes a communication module 1110, a coefficient selection module 1120, a virtual speaker selection module 1130, an encoding module 1140, and a storage module 1150. The three-dimensional audio signal encoding apparatus 1100 is configured to implement the functions of the encoder 113 in the method embodiments shown in FIG. 6 to FIG. 10.

The communication module 1110 is configured to obtain a current frame of a three-dimensional audio signal. Optionally, the communication module 1110 may alternatively receive a current frame of a three-dimensional audio signal that is obtained by another device, or obtain a current frame of a three-dimensional audio signal from the storage module 1150. The current frame of the three-dimensional audio signal is an HOA signal. A frequency domain feature value of a coefficient is determined based on a two-dimensional vector. The two-dimensional vector includes an HOA coefficient of an HOA signal.

The coefficient selection module 1120 is configured to obtain a fourth quantity of coefficients for the current frame of the three-dimensional audio signal and frequency domain feature values of the fourth quantity of coefficients.

The coefficient selection module 1120 is further configured to select a third quantity of representative coefficients from the fourth quantity of coefficients based on the frequency domain feature values of the fourth quantity of coefficients, where the third quantity is less than the fourth quantity.

When the three-dimensional audio signal encoding apparatus 1100 is configured to implement the functions of the encoder 113 in the method embodiments shown in FIG. 6 to FIG. 10, the coefficient selection module 1120 is configured to implement related functions in S610 and S620.

In an embodiment, the coefficient selection module 1120 is configured to select, based on the frequency domain feature values of the fourth quantity of coefficients, a representative coefficient from at least one subband included in a spectral range indicated by the fourth quantity of coefficients, to obtain the third quantity of representative coefficients. At least two subbands include different quantities of coefficients, or at least two subbands each include a same quantity of coefficients.

For example, the coefficient selection module 1120 is configured to select Z representative coefficients from each subband based on a frequency domain feature value of a coefficient in each subband, to obtain the third quantity of representative coefficients, where Z is a positive integer.

For another example, when the at least one subband includes at least two subbands, the coefficient selection module 1120 is configured to: determine a weight of each of the at least two subbands based on a frequency domain feature value of a first candidate coefficient in each subband; adjust a frequency domain feature value of a second candidate coefficient in each subband based on the weight of each subband, to obtain an adjusted frequency domain feature value of the second candidate coefficient in each subband, where the first candidate coefficient and the second candidate coefficient are some coefficients in the subband; and determine the third quantity of representative coefficients based on an adjusted frequency domain feature value of a second candidate coefficient in the at least two subbands and a frequency domain feature value of a coefficient other than the second candidate coefficient in the at least two subbands.

The virtual speaker selection module 1130 is configured to select a second quantity of representative virtual speakers for the current frame from a candidate virtual speaker set based on the third quantity of representative coefficients.

When the three-dimensional audio signal encoding apparatus 1100 is configured to implement the functions of the encoder 113 in the method embodiments shown in FIG. 6 to FIG. 10, the virtual speaker selection module 1130 is configured to implement related functions in S630.

For example, the virtual speaker selection module 1130 is configured to: determine a first quantity of virtual speakers and a first quantity of vote values based on the third quantity of representative coefficients for the current frame, the candidate virtual speaker set, and a quantity of rounds of voting, where the virtual speakers are in a one-to-one correspondence with the vote values, the first quantity of virtual speakers include a first virtual speaker, the first quantity of vote values include a vote value of the first virtual speaker, the first virtual speaker corresponds to the vote value of the first virtual speaker, the vote value of the first virtual speaker represents a priority of using the first virtual speaker to encode the current frame, the candidate virtual speaker set includes a fifth quantity of virtual speakers, the fifth quantity of virtual speakers include the first quantity of virtual speakers, the quantity of rounds of voting is an integer greater than or equal to 1, and the quantity of rounds of voting is less than or equal to the fifth quantity; and select the second quantity of representative virtual speakers for the current frame from the first quantity of virtual speakers based on the first quantity of vote values, where the second quantity is less than the first quantity.

In an embodiment, the virtual speaker selection module 1130 is further configured to: obtain, based on the first quantity of vote values and a sixth quantity of final vote values for a previous frame, a seventh quantity of final vote values for the current frame that correspond to a seventh quantity of virtual speakers and the current frame, where the seventh quantity of virtual speakers include the first quantity of virtual speakers, the seventh quantity of virtual speakers include a sixth quantity of virtual speakers, virtual speakers included in the sixth quantity of virtual speakers are representative virtual speakers for the previous frame of the three-dimensional audio signal that are used to encode the previous frame; and select the second quantity of representative virtual speakers for the current frame from the seventh quantity of virtual speakers based on the seventh quantity of final vote values for the current frame, where the second quantity is less than the seventh quantity.

In an embodiment, the virtual speaker selection module 1130 is further configured to: obtain a first correlation between the current frame and a representative virtual speaker set for the previous frame, where the representative virtual speaker set for the previous frame includes the sixth quantity of virtual speakers, virtual speakers included in the sixth quantity of virtual speakers are representative virtual speakers for the previous frame of the three-dimensional audio signal that are used to encode the previous frame, and the first correlation is used to determine whether to reuse the representative virtual speaker set for the previous frame when the current frame is encoded; and if the first correlation does not satisfy a reuse condition, obtain the fourth quantity of coefficients for the current frame of the three-dimensional audio signal and the frequency domain feature values of the fourth quantity of coefficients.

The encoding module 1140 is configured to encode the current frame based on the second quantity of representative virtual speakers for the current frame to obtain a bitstream.

When the three-dimensional audio signal encoding apparatus 1100 is configured to implement the functions of the encoder 113 in the method embodiments shown in FIG. 6 to FIG. 10, the encoding module 1140 is configured to implement related functions in S640.

For example, the encoding module 1140 is configured to generate a virtual speaker signal based on the current frame and the second quantity of representative virtual speakers for the current frame, and encode the virtual speaker signal to obtain the bitstream.

The storage module 1150 is configured to store a coefficient related to the three-dimensional audio signal, the candidate virtual speaker set, the representative virtual speaker set for the previous frame, a selected coefficient and virtual speaker, and the like, so that the encoding module 1140 encodes the current frame to obtain the bitstream and transmits the bitstream to a decoder.

It should be understood that the three-dimensional audio signal encoding apparatus 1100 in this embodiment of this application may be implemented by using an application-specific integrated circuit (ASIC) or a programmable logic device (PLD). The PLD may be a complex programmable logic device (CPLD), a field-programmable gate array (FPGA), a generic array logic (GAL), or any combination thereof. When the three-dimensional audio signal encoding method shown in FIG. 6 to FIG. 10 is implemented by software, the three-dimensional audio signal encoding apparatus 1100 and the modules thereof may alternatively be software modules.

For more detailed descriptions of the communication module 1110, the coefficient selection module 1120, the virtual speaker selection module 1130, the encoding module 1140, and the storage module 1150, directly refer to related descriptions in the method embodiments shown in FIG. 6 to FIG. 10. Details are not described herein again.

Figure 12:
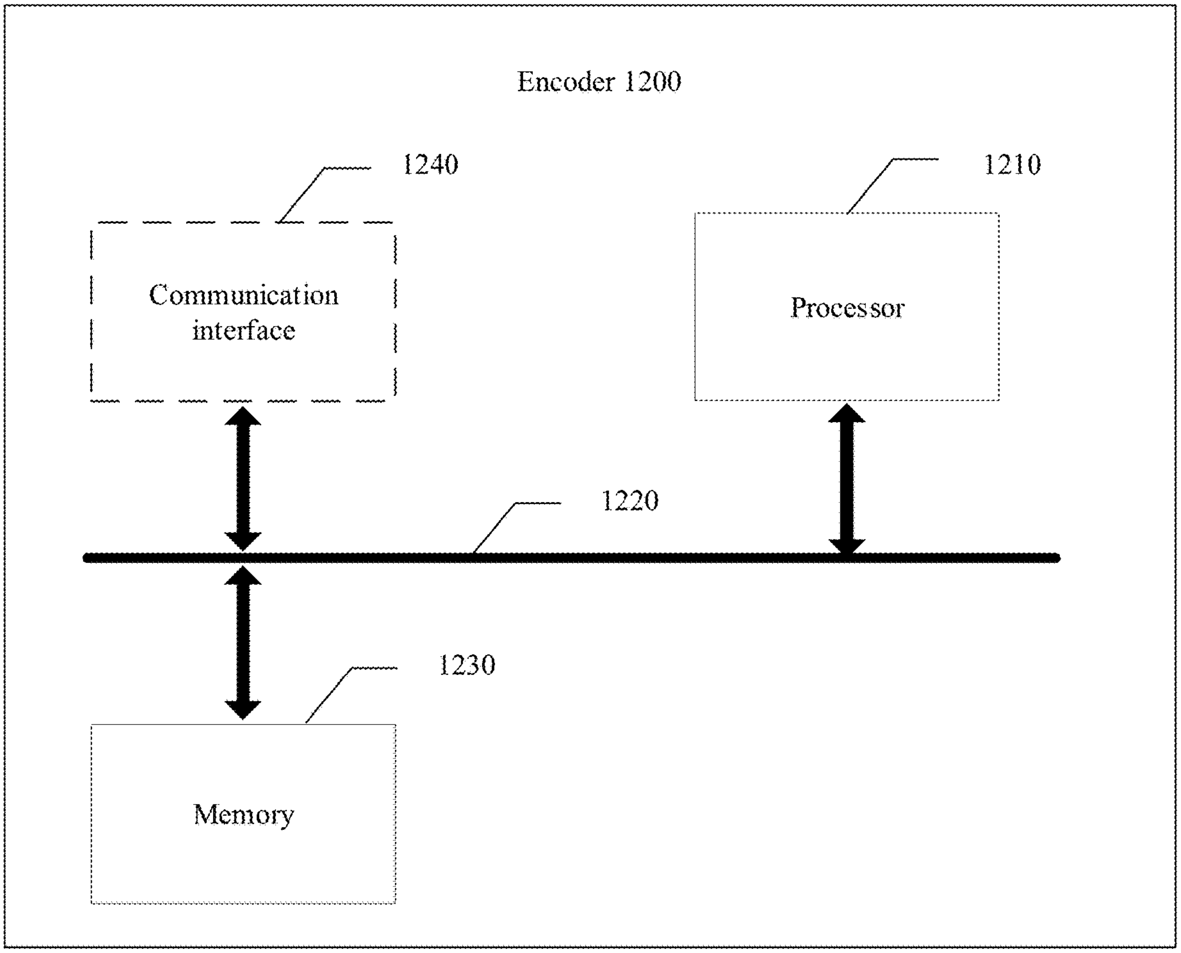
FIG. 12 is a schematic diagram of a structure of an encoder according to this application.

FIG. 12 is a schematic diagram of a structure of an encoder 1200 according to an embodiment. As shown in FIG. 12, the encoder 1200 includes a processor 1210, a bus 1220, a memory 1230, and a communication interface 1240.

It should be understood that, in this embodiment, the processor 1210 may be a central processing unit (CPU), or the processor 1210 may be another general-purpose processor, a digital signal processor (DSP), an ASIC, an FPGA or another programmable logic device, a discrete gate or transistor logic device, a discrete hardware component, or the like. The general-purpose processor may be a microprocessor, any conventional processor, or the like.

The processor may alternatively be a graphics processing unit (GPU), a neural network processing unit (NPU), a microprocessor, or one or more integrated circuits for controlling program execution for the solutions of this application.

The communication interface 1240 is configured to implement communication between the encoder 1200 and an external device or component. In this embodiment, the communication interface 1240 is configured to receive a three-dimensional audio signal.

The bus 1220 may include a channel for transmitting information between the foregoing components (for example, the processor 1210 and the memory 1230). In addition to a data bus, the bus 1220 may further include a power bus, a control bus, a status signal bus, and the like. However, for clarity of description, various buses are marked as the bus 1220 in the figure.

In an example, the encoder 1200 may include a plurality of processors. The processor may be a multi-core (multi-CPU) processor. The processor herein may be one or more devices, circuits, and/or computing units for processing data (for example, computer program instructions). The processor 1210 may invoke a coefficient related to a three-dimensional audio signal, a candidate virtual speaker set, a representative virtual speaker set for a previous frame, a selected coefficient and virtual speaker, and the like that are stored in the memory 1230.

It should be noted that, in FIG. 12, only an example in which the encoder 1200 includes one processor 1210 and one memory 1230 is used. Herein, the processor 1210 and the memory 1230 each indicate a type of component or device. In a specific embodiment, a quantity of components or devices of each type may be determined according to a service requirement.

The memory 1230 may correspond to a storage medium, for example, a magnetic disk such as a mechanical hard disk or a solid state drive, that is configured to store information such as a coefficient related to a three-dimensional audio signal, a candidate virtual speaker set, a representative virtual speaker set for a previous frame, and a selected coefficient and virtual speaker in the method embodiments.

The encoder 1200 may be a general-purpose device or a dedicated device. For example, the encoder 1200 may be an X86-based or ARM-based server, or may be another dedicated server such as a policy control and charging (PCC) server. A type of the encoder 1200 is not limited in this embodiment of this application.

It should be understood that the encoder 1200 according to this embodiment may correspond to the three-dimensional audio signal encoding apparatus 1100 in embodiments, and may correspond to a corresponding entity for performing any one of the methods in FIG. 6 to FIG. 10. In addition, the foregoing and other operations and/or functions of the modules in the three-dimensional audio signal encoding apparatus 1100 are respectively intended to implement corresponding processes of the methods in FIG. 6 to FIG. 10. For brevity, details are not described herein again.

The method operations in embodiments may be implemented by hardware, or may be implemented by a processor executing software instructions. The software instructions may include corresponding software modules. The software modules may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to the processor, so that the processor can read information from the storage medium and write information into the storage medium. Certainly, the storage medium may alternatively be a component of the processor. The processor and the storage medium may be located in an ASIC. In addition, the ASIC may be located in a network device or a terminal device. Certainly, the processor and the storage medium may exist in the network device or the terminal device as discrete components.

All or some of the foregoing embodiments may be implemented by software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on a computer, all or some of the processes or the functions in embodiments of this application are performed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium accessible to a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid state drive (SSD).

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A method for encoding three-dimensional (3D) audio signals, comprising:

obtaining, by an encoder, a fourth quantity of coefficients for a current frame of a 3D audio signal and frequency domain feature values of the fourth quantity of coefficients;

selecting, by the encoder, a third quantity of representative coefficients from the fourth quantity of coefficients based on the frequency domain feature values of the fourth quantity of coefficients, wherein the third quantity is less than the fourth quantity;

selecting, by the encoder, a second quantity of representative virtual speakers for the current frame from a candidate virtual speaker set based on the third quantity of representative coefficients, including:

determining a first quantity of virtual speakers and a first quantity of vote values corresponding to the first quantity of virtual speakers respectively, based on the third quantity of representative coefficients for the current frame, the candidate virtual speaker set, and a quantity of rounds of voting, wherein the first quantity of virtual speakers comprise a first virtual speaker, a vote value of the first virtual speaker represents a priority of the first virtual speaker, the candidate virtual speaker set comprises a fifth quantity of virtual speakers that comprise the first quantity of virtual speakers, the first quantity is less than or equal to the fifth quantity, the quantity of rounds of voting is an integer greater than or equal to 1, and the quantity of rounds of voting is less than or equal to the fifth quantity; and encoding, by the encoder, the current frame based on the second quantity of representative virtual speakers for the current frame to obtain a bitstream.

2. The method according to claim 1, wherein selecting the third quantity of representative coefficients from the fourth quantity of coefficients comprises:

selecting, based on the frequency domain feature values of the fourth quantity of coefficients, a representative coefficient from at least one subband comprised in a spectral range indicated by the fourth quantity of coefficients, to obtain the third quantity of representative coefficients.

3. The method according to claim 2, wherein selecting a representative coefficient from at least one subband comprised in a spectral range comprises:

selecting Z representative coefficients from each of the at least one subband based on a frequency domain feature value of a coefficient in each subband, to obtain the third quantity of representative coefficients, wherein Z is a positive integer.

4. The method according to claim 2, wherein when the at least one subband comprises at least two subbands, selecting the representative coefficient from at least one subband comprised in a spectral range comprises:

determining a weight of each of the at least two subbands based on a frequency domain feature value of a first candidate coefficient in each subband;

adjusting a frequency domain feature value of a second candidate coefficient in each subband based on the weight of each subband, to obtain an adjusted frequency domain feature value of the second candidate coefficient in each subband; and determining the third quantity of representative coefficients based on an adjusted frequency domain feature value of a second candidate coefficient in the at least two subbands and a frequency domain feature value of a coefficient other than the second candidate coefficient in the at least two subbands.

5. The method according to claim 1, wherein selecting a second quantity of representative virtual speakers for the current frame from a candidate virtual speaker set comprises:

selecting the second quantity of representative virtual speakers for the current frame from the first quantity of virtual speakers based on the first quantity of vote values, wherein the second quantity is less than the first quantity.

6. The method according to claim 5, wherein selecting the second quantity of representative virtual speakers for the current frame from the first quantity of virtual speakers comprises:

obtaining, based on the first quantity of vote values and a sixth quantity of final vote values for a previous frame, a seventh quantity of final vote values for the current frame that correspond to a seventh quantity of virtual speakers and the current frame, wherein the seventh quantity of virtual speakers comprise the first quantity of virtual speakers, the seventh quantity of virtual speakers comprise a sixth quantity of virtual speakers, the sixth quantity of virtual speakers comprised in a representative virtual speaker set for the previous frame are in a one-to-one correspondence with the sixth quantity of final vote values for the previous frame, and the sixth quantity of virtual speakers are virtual speakers used when the previous frame of the 3D audio signal is encoded; and selecting the second quantity of representative virtual speakers for the current frame from the seventh quantity of virtual speakers based on the seventh quantity of final vote values for the current frame, wherein the second quantity is less than the seventh quantity.

7. The method according to claim 1, further comprising:

obtaining a first correlation between the current frame and a representative virtual speaker set for a previous frame, wherein the representative virtual speaker set for the previous frame comprises a sixth quantity of virtual speakers, virtual speakers comprised in the sixth quantity of virtual speakers are representative virtual speakers for the previous frame of the 3D audio signal that are used to encode the previous frame, and the first correlation is used to determine whether to reuse the representative virtual speaker set for the previous frame when the current frame is encoded; and if the first correlation does not satisfy a reuse condition, obtaining the fourth quantity of coefficients for the current frame of the 3D audio signal and the frequency domain feature values of the fourth quantity of coefficients.

8. The method according to claim 1, wherein the current frame of the 3D audio signal is a higher order ambisonics (HOA) signal, and a frequency domain feature value of the coefficient is determined based on a coefficient of the HOA signal.

9. An encoder, comprising:

at least one processor and a memory to store a computer program, which when executed by the at least one processor, cause the at least one processor to perform a 3D audio signal encoding method, the method comprising:

obtaining a fourth quantity of coefficients for a current frame of a 3D audio signal and frequency domain feature values of the fourth quantity of coefficients;

selecting a third quantity of representative coefficients from the fourth quantity of coefficients based on the frequency domain feature values of the fourth quantity of coefficients, wherein the third quantity is less than the fourth quantity;

selecting a second quantity of representative virtual speakers for the current frame from a candidate virtual speaker set based on the third quantity of representative coefficients, including:

determining a first quantity of virtual speakers and a first quantity of vote values corresponding to the first quantity of virtual speakers respectively, based on the third quantity of representative coefficients for the current frame, the candidate virtual speaker set, and a quantity of rounds of voting, wherein the first quantity of virtual speakers comprise a first virtual speaker, a vote value of the first virtual speaker represents a priority of the first virtual speaker, the candidate virtual speaker set comprises a fifth quantity of virtual speakers that comprise the first quantity of virtual speakers, the first quantity is less than or equal to the fifth quantity, the quantity of rounds of voting is an integer greater than or equal to 1, and the quantity of rounds of voting is less than or equal to the fifth quantity; and encoding the current frame based on the second quantity of representative virtual speakers for the current frame to obtain a bitstream.

10. The encoder according to claim 9, wherein selecting the third quantity of representative coefficients from the fourth quantity of coefficients comprises:

selecting, based on the frequency domain feature values of the fourth quantity of coefficients, a representative coefficient from at least one subband comprised in a spectral range indicated by the fourth quantity of coefficients, to obtain the third quantity of representative coefficients.

11. The encoder according to claim 10, wherein selecting a representative coefficient from at least one subband comprised in a spectral range comprises:

selecting Z representative coefficients from each of the at least one subband based on a frequency domain feature value of a coefficient in each subband, to obtain the third quantity of representative coefficients, wherein Z is a positive integer.

12. The encoder according to claim 10, wherein when the at least one subband comprises at least two subbands, selecting the representative coefficient from at least one subband comprised in a spectral range comprises:

determining a weight of each of the at least two subbands based on a frequency domain feature value of a first candidate coefficient in each subband;

adjusting a frequency domain feature value of a second candidate coefficient in each subband based on the weight of each subband, to obtain an adjusted frequency domain feature value of the second candidate coefficient in each subband; and determining the third quantity of representative coefficients based on an adjusted frequency domain feature value of a second candidate coefficient in the at least two subbands and a frequency domain feature value of a coefficient other than the second candidate coefficient in the at least two subbands.

13. The encoder according to claim 9, wherein selecting a second quantity of representative virtual speakers for the current frame from a candidate virtual speaker set comprises:

selecting the second quantity of representative virtual speakers for the current frame from the first quantity of virtual speakers based on the first quantity of vote values, wherein the second quantity is less than the first quantity.

14. The encoder according to claim 13, wherein selecting the second quantity of representative virtual speakers for the current frame from the first quantity of virtual speakers comprises:

obtaining, based on the first quantity of vote values and a sixth quantity of final vote values for a previous frame, a seventh quantity of final vote values for the current frame that correspond to a seventh quantity of virtual speakers and the current frame, wherein the seventh quantity of virtual speakers comprise the first quantity of virtual speakers, the seventh quantity of virtual speakers comprise a sixth quantity of virtual speakers, the sixth quantity of virtual speakers comprised in a representative virtual speaker set for the previous frame are in a one-to-one correspondence with the sixth quantity of final vote values for the previous frame, and the sixth quantity of virtual speakers are virtual speakers used when the previous frame of the 3D audio signal is encoded; and selecting the second quantity of representative virtual speakers for the current frame from the seventh quantity of virtual speakers based on the seventh quantity of final vote values for the current frame, wherein the second quantity is less than the seventh quantity.

15. The encoder according to claim 9, wherein the method further comprises:

obtaining a first correlation between the current frame and a representative virtual speaker set for a previous frame, wherein the representative virtual speaker set for the previous frame comprises the sixth quantity of virtual speakers, virtual speakers comprised in a sixth quantity of virtual speakers are representative virtual speakers for the previous frame of the 3D audio signal that are used to encode the previous frame, and the first correlation is used to determine whether to reuse the representative virtual speaker set for the previous frame when the current frame is encoded; and if the first correlation does not satisfy a reuse condition, obtaining the fourth quantity of coefficients for the current frame of the 3D audio signal and the frequency domain feature values of the fourth quantity of coefficients.

16. A system, comprising the encoder according to claim 9 and a decoder, wherein the decoder is configured to decode a bitstream generated by the encoder.

17. A non-transitory computer-readable storage medium, comprising a bitstream obtained in a three-dimensional (3D) audio signal encoding method, the method comprising:

obtaining a fourth quantity of coefficients for a current frame of a 3D audio signal and frequency domain feature values of the fourth quantity of coefficients;

selecting a third quantity of representative coefficients from the fourth quantity of coefficients based on the frequency domain feature values of the fourth quantity of coefficients, wherein the third quantity is less than the fourth quantity;

selecting a second quantity of representative virtual speakers for the current frame from a candidate virtual speaker set based on the third quantity of representative coefficients, including:

determining a first quantity of virtual speakers and a first quantity of vote values corresponding to the first quantity of virtual speakers respectively, based on the third quantity of representative coefficients for the current frame, the candidate virtual speaker set, and a quantity of rounds of voting, wherein the first quantity of virtual speakers comprise a first virtual speaker, a vote value of the first virtual speaker represents a priority of the first virtual speaker, the candidate virtual speaker set comprises a fifth quantity of virtual speakers that comprise the first quantity of virtual speakers, the first quantity is less than or equal to the fifth quantity, the quantity of rounds of voting is an integer greater than or equal to 1, and the quantity of rounds of voting is less than or equal to the fifth quantity; and encoding the current frame based on the second quantity of representative virtual speakers for the current frame to obtain a bitstream.

18. The computer-readable storage medium according to claim 17, wherein selecting a third quantity of representative coefficients from the fourth quantity of coefficients comprises:

selecting, based on the frequency domain feature values of the fourth quantity of coefficients, a representative coefficient from at least one subband comprised in a spectral range indicated by the fourth quantity of coefficients, to obtain the third quantity of representative coefficients.

19. The computer-readable storage medium according to claim 18, wherein selecting a representative coefficient from at least one subband comprised in a spectral range comprises:

selecting Z representative coefficients from each of the at least one subband based on a frequency domain feature value of a coefficient in each subband, to obtain the third quantity of representative coefficients, wherein Z is a positive integer.

20. The computer-readable storage medium according to claim 18, wherein when the at least one subband comprises at least two subbands, selecting a representative coefficient from at least one subband comprised in a spectral range comprises:

determining a weight of each of the at least two subbands based on a frequency domain feature value of a first candidate coefficient in each subband;

adjusting a frequency domain feature value of a second candidate coefficient in each subband based on the weight of each subband, to obtain an adjusted frequency domain feature value of the second candidate coefficient in each subband; and determining the third quantity of representative coefficients based on an adjusted frequency domain feature value of a second candidate coefficient in the at least two subbands and a frequency domain feature value of a coefficient other than the second candidate coefficient in the at least two subbands.

* * * * *